(12) United States Patent
Kurokawa et al.

(10) Patent No.: US 9,088,880 B2
(45) Date of Patent: Jul. 21, 2015

(54) FEMTOCELL BASE STATION, GATEWAY SYSTEM, MAP-GW APPARATUS, COMMUNICATION SYSTEM, CONTROL METHOD, AND PROGRAM

(75) Inventors: Osamu Kurokawa, Minato-ku (JP); Kazuki Eguchi, Minato-ku (JP); Naoki Yoshida, Minato-ku (JP); Shunsuke Yokouchi, Minato-ku (JP); Toru Shiiba, Minato-ku (JP); Yasuyuki Ueda, Minato-ku (JP); Tomiharu Hamaguchi, Minato-ku (JP); Yasuhiro Watanabe, Minato-ku (JP); Hiroaki Akiyama, Minato-ku (JP); Takayuki Kido, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 315 days.

(21) Appl. No.: 13/377,754

(22) PCT Filed: Jun. 30, 2010

(86) PCT No.: PCT/JP2010/061120
§ 371 (c)(1),
(2), (4) Date: Jun. 27, 2012

(87) PCT Pub. No.: WO2011/002007
PCT Pub. Date: Jan. 6, 2011

(65) Prior Publication Data
US 2012/0258743 A1      Oct. 11, 2012

(30) Foreign Application Priority Data
Jul. 2, 2009    (JP) ................................. 2009-158002

(51) Int. Cl.
*H04W 4/14*    (2009.01)
*H04L 12/64*   (2006.01)
(Continued)

(52) U.S. Cl.
CPC ............. *H04W 4/14* (2013.01); *H04L 12/6418* (2013.01); *H04L 12/66* (2013.01); *H04L 69/08* (2013.01); *H04M 7/127* (2013.01); *H04W 4/18* (2013.01); *H04W 80/10* (2013.01); *H04W 84/045* (2013.01)

(58) Field of Classification Search
CPC ....... H04W 4/14; H04W 4/18; H04W 84/045; H04M 7/127
USPC ........... 455/466, 410, 412.1, 414.1, 418, 445, 455/518; 370/335, 352; 709/206
See application file for complete search history.

(56) References Cited

U.S. PATENT DOCUMENTS 7,181,217 B2 *   2/2007   Kalavade .................... 455/435.1
8,055,287 B1 *  11/2011   Upadhyay et al. ............ 455/466
(Continued)

FOREIGN PATENT DOCUMENTS

CN          1823498 A      8/2006
CN        101422065 A      4/2009
(Continued)

OTHER PUBLICATIONS

Office Action dated Oct. 8, 2013, issued by the Japanese Patent Office in corresponding Application No. 2009-158002.
(Continued)

*Primary Examiner* — Khawar Iqbal
(74) *Attorney, Agent, or Firm* — Sughrue Mion, PLLC

(57) ABSTRACT

A femtocell base station (FAP) converts, when information concerning a SMS is received from UE (User Equipment), the received information concerning the SMS into a SIP (Session Initiation Protocol) message including the received information concerning the SMS and transmits the converted SIP message to the core network side. The femtocell base station converts, when a SIP message including information concerning the SMS is received from the core network side, the information concerning the SMS included in the received SIP message into a message that can be recognized by the UE and transmits the converted information concerning the SMS to the UE.

10 Claims, 27 Drawing Sheets

(51) Int. Cl.
*H04L 12/66* (2006.01)
*H04M 7/12* (2006.01)
*H04L 29/06* (2006.01)
*H04W 4/18* (2009.01)
*H04W 80/10* (2009.01)
*H04W 84/04* (2009.01)

(56) References Cited

U.S. PATENT DOCUMENTS

| | | | |
|---|---|---|---|
| 8,792,920 B2 * | 7/2014 | Osborn | 455/466 |
| 2003/0091020 A1 | 5/2003 | Bantukul et al. | |
| 2007/0032251 A1 | 2/2007 | Shaheen | |
| 2008/0076386 A1 | 3/2008 | Khetawat et al. | |
| 2008/0096553 A1 * | 4/2008 | Saksena et al. | 455/426.2 |
| 2008/0207181 A1 * | 8/2008 | Jiang | 455/414.1 |
| 2008/0240088 A1 | 10/2008 | Nakata | |
| 2008/0287106 A1 * | 11/2008 | Baldwin et al. | 455/412.2 |
| 2009/0070469 A1 * | 3/2009 | Roach et al. | 709/226 |
| 2009/0197622 A1 * | 8/2009 | Atarius | 455/466 |
| 2010/0099443 A1 * | 4/2010 | King et al. | 455/466 |
| 2010/0233992 A1 * | 9/2010 | Nooren | 455/404.1 |
| 2010/0265884 A1 * | 10/2010 | Vikberg et al. | 370/328 |
| 2010/0331023 A1 * | 12/2010 | Cai et al. | 455/466 |
| 2011/0072099 A1 * | 3/2011 | Harju et al. | 709/206 |
| 2013/0005371 A1 * | 1/2013 | Cai et al. | 455/466 |
| 2013/0029699 A1 * | 1/2013 | Alston et al. | 455/466 |
| 2013/0137471 A1 * | 5/2013 | Nooren | 455/466 |
| 2014/0119285 A1 * | 5/2014 | Shaheen et al. | 370/328 |

FOREIGN PATENT DOCUMENTS

| | | |
|---|---|---|
| JP | 2000-511754 A | 9/2000 |
| JP | 2003-023674 A | 1/2003 |
| JP | 2008-131242 A | 1/2003 |
| JP | 2005-217959 A | 8/2005 |
| JP | 2008-544608 A | 12/2008 |
| JP | 2009-504049 A | 1/2009 |
| JP | 2009-504051 A | 1/2009 |
| JP | 2009-506590 A | 2/2009 |
| WO | WO 2007/015068 A1 | 2/2007 |
| WO | WO 2007/015075 A1 | 2/2007 |
| WO | WO 2007/019203 A3 | 2/2007 |
| WO | 2009033179 A2 | 3/2009 |

OTHER PUBLICATIONS

Communication dated Jan. 7, 2014, issued by the Japanese Patent Office in corresponding Application No. 2009-158002.

Office Action dated Nov. 19, 2013. issued by the State Intellectual Property Office of the P.R.C. in corresponding Chinese Application No. 201080029934.8.

Office Action dated Jun. 13, 2014, issued by the State Intellectual Property Office of the People's Republic of China in corresponding Chinese Application No. 201080029934.8.

* cited by examiner

Fig. 11

ERROR Code EXCERPT

5 : unidentifiedSubscriber

6 : absentSubscriberSM
 -0 : no paging response via the MSC
 -1 : IMSI detached
 -2 : roaming restriction
 -3 : deregistered in the HLR for non GPRS
 -4 : MS purged for non GPRS
 -5 : no paging response via the SGSN
 -6 : GPRS detached
 -7 : deregistered in the HLR for GPRS
 -8 : MS purged for GPRS
 -9 : Unidentified subscriber via the MSC
 -10 : Unidentified subscriber via the SGSN

32 : SMdeliverFailure
 -0 : memoryCapacityExceeded
 -1 : equipmentProtocolError
 -2 : equipmentNotSM-Equipped
 -3 : unknownServiceCentre
 -4 : sc-Congestion
 -5 : invalidSME-Address
 -6 : subscriberNotSC-Subscriber 1. SMS-MT DELIVERY FAILURE Case 5: NO VLR

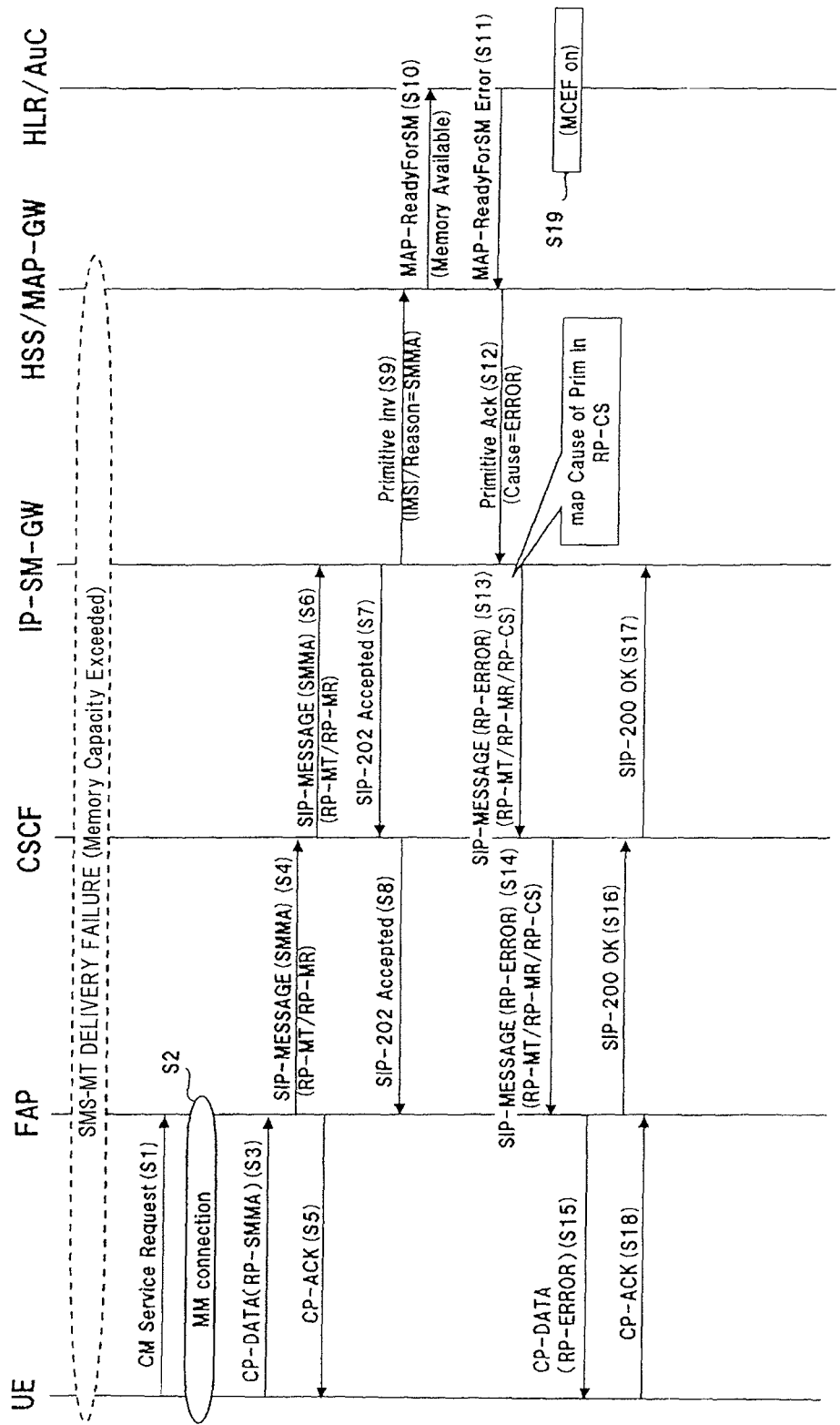

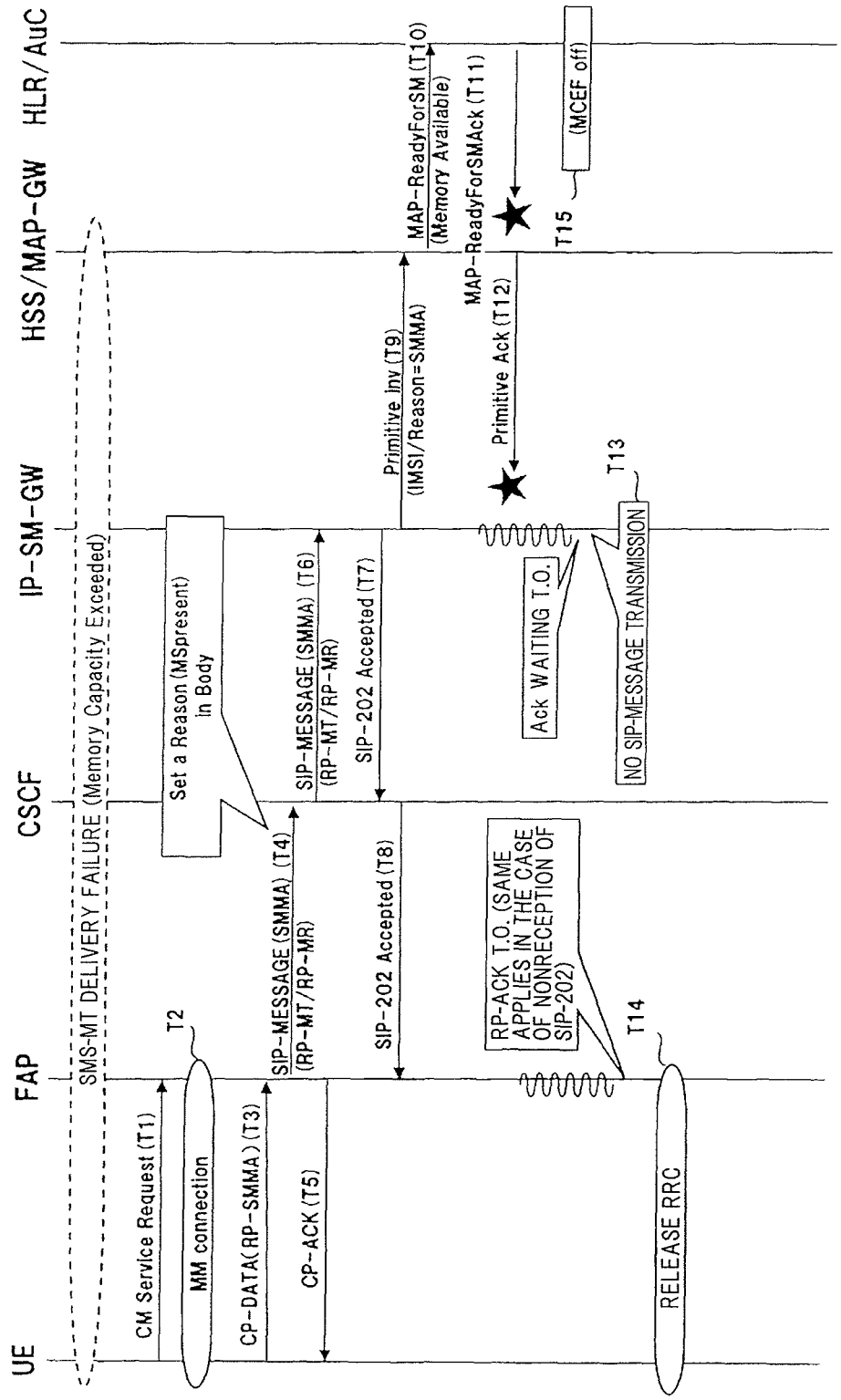

Fig.25

ReadyFor SM Spec

MESSAGE sip:IP-SM-GW@operator.com SIP/2.0
From: <sip:09011111111@operator.com>;tag=fssUA_4067089193-547
To: <sip:IP-SM-GW@operator.com>
Call-ID: 4067087174-540
CSeq: 1 MESSAGE
Max-Forwards: 70
Allow: INVITE,BYE,CANCEL,ACK,INFO,PRACK,COMET,OPTIONS,SUBSCRIBE,NOTIFY,MESSAGE,REGISTER,UPDATE
Privacy: none  ~ IMSI
P-Preferred-Identity: <sip:44020xxx@operator.com;cpc=notification>
Via: SIP/2.0/UDP 172.16.250.1:5060;branch=z9hG4bK4067088476-547
Content-Type: application/vnd.3gpp.sms
Content-Length: 6
                                    Body
06ff01 ┌─ 06 : RP-MT (SMMA)
       ├─ ff : RP-MR
       └─ 01 : Reason (MSpresent)

FEMTOCELL BASE STATION, GATEWAY SYSTEM, MAP-GW APPARATUS, COMMUNICATION SYSTEM, CONTROL METHOD, AND PROGRAM

CROSS REFERENCE TO RELATED APPLICATIONS

This application is a National Stage of International Application No. PCT/JP2010/061120 filed Jun. 30, 2010, claiming priority based on Japanese Patent Application No. 2009-158002, filed Jul. 2, 2009, the contents of all of which are incorporated herein by reference in their entirety.

TECHNICAL FIELD

The present invention relates to a technique for performing communication using a femtocell base station.

BACKGROUND ART

In recent years, in order to realize improvement of the quality of a communication area, development of a communication system in which a femtocell base station is installed is advanced (see, for example, Patent Documents 1 and 2).

The femtocell base station is a small radio base station that covers a narrow communication area having a radius of about several tens meters. The femtocell base station is set in a room of a home, an office, or the like to cover a communication area in the room. This makes it possible to improve communication quality of a communication area that cannot be covered by an existing base station for macrocell. This also makes it possible to cover a communication area without spending cost for infrastructure facilities of the base station for macrocell.

CITATION LIST

Patent Literature

Patent Literature 1: JP2009-504049A
Patent Literature 2: JP2009-504051A

SUMMARY OF INVENTION

Technical Problem

In the existing 3G network, a Short Message Service (SMS) is provided to UE (User Equipment).

However, in the existing 3G network, the present situation is that a configuration in which the femtocell base station is installed is not taken into account. Therefore, in the communication system in which the femtocell base station is installed, it is necessary to build a system that can realize the Short Message Service (SMS) provided in the existing 3G network.

The present invention has been devised in view of the circumstances and it is an object of the present invention to provide a femtocell base station, a gateway system, a MAP gateway apparatus (MAP-GW apparatus), a communication system, a control method, and a program that can realize, in a communication system in which the femtocell base station is installed, the Short Message Service (SMS) provided in the existing 3G network.

Solution to Problem

In order to attain such an object, the present invention has characteristics explained below.

<Femtocell Base Station>

A femtocell base station according to the present invention is a femtocell base station that connects UE (User Equipment) to a core network side, the femtocell base station characterized by including:

first transmitting means for converting, when information concerning a SMS (Short Message Service) is received from the UE, the received information concerning the SMS into a SIP (Session Initiation Protocol) message including the received information concerning the SMS and transmitting the converted SIP message to the core network side; and second transmitting means for converting, when a SIP message including information concerning the SMS is received from the core network side, the information concerning the SMS included in the received SIP message into a message that can be recognized by the UE and transmitting the converted information concerning the SMS to the UE.

<Femtocell Base Station>

A femtocell base station according to the present invention is a femtocell base station that connects UE (User Equipment) to a core network side, the femtocell base station characterized by including control means for controlling ON and OFF of a flag used in controlling whether a SMS (Short Message Service) reaches the destination.

<Gateway System>

A gateway system according to the present invention is a gateway system that transfers, via a femtocell base station that connects UE (User Equipment) to a core network side, a short message to the UE, the gateway system characterized by including transfer means for, when a SIP (Session Initiation Protocol) message is received, transferring, when the received SIP message is transmitted to a SMSC (Short Message Service Center), content of the SIP message to the SMSC and transferring, when the received SIP message is transmitted to a destination other than the SMSC, the content of the SIP message to an apparatus on the core network side.

<MAP Gateway Apparatus (MAP-GW Apparatus)>

A MAP gateway apparatus according to the present invention is a MAP (Mobile Application Part) gateway apparatus used in a communication system having a function of delivering a short message, the MAP gateway apparatus characterized by including control means for transmitting, when MS Present information or SMMA (Short Message Memory Available) information is included in a received message, a message corresponding to the MS Present information or the SMMA information to a HLR (Home Location Register).

<Communication System>

A communication system according to the present invention is a communication system including at least UE (User Equipment) and a femtocell base station that connects the UE to a core network side, characterized in that the femtocell base station includes:

first transmitting means for converting, when information concerning a SMS (Short Message Service) is received from the UE, the received information concerning the SMS into a SIP (Session Initiation Protocol) message including the received information concerning the SMS and transmitting the converted SIP message to the core network side; and second transmitting means for converting, when a SIP message including information concerning the SMS is received from the core network side, the information concerning the SMS included in the received SIP message into a message that can be recognized by the UE and transmitting the converted information concerning the SMS to the UE.

A communication system according to the present invention is a communication system including at least UE (User Equipment) and a femtocell base station that connects the UE to a core network side, characterized in that the femtocell base station includes control means for controlling ON and OFF of a flag used in controlling whether a SMS (Short Message Service) reaches the destination.

A communication system according to the present invention is a communication system including UE (User Equipment), a femtocell base station that connects the UE to a core network side, a SMSC (Short Message Service. Center) that manages a short message delivered to the UE, and a gateway system that transfers the short message to the UE via the femtocell base station, characterized in that the gateway system includes transfer means for, when a SIP (Session Initiation Protocol) message is received, transferring, when the received SIP message is transmitted to the SMSC, content of the SIP message to the SMSC and transferring, when the received SIP message is transmitted to a destination other than the SMSC, the content of the SIP message to an apparatus on the core network side.

<Control Method>

A control method according to the present invention is a control method performed in a femtocell base station that connects UE (User Equipment) to a core network side, the control method characterized by including:

a first transmitting step of converting, when information concerning a SMS (Short Message Service) is received from the UE, the received information concerning the SMS into a SIP (Session Initiation Protocol) message including the received information concerning the SMS and transmitting the converted SIP message to the core network side; and a second transmitting step of converting, when a SIP message including information concerning the SMS is received from the core network side, the information concerning the SMS included in the received SIP message into a message that can be recognized by the UE and transmitting the converted information concerning the SMS to the UE.

A control method according to the present invention is a control method performed in a femtocell base station that connects UE (User Equipment) to a core network side, the control method characterized by including:

a control step of controlling ON and OFF of a flag used in controlling whether a SMS (Short Message Service) reaches the destination.

A control method according to the present invention is a control method performed in a gateway system that transfers, via a femtocell base station that connects UE (User Equipment) to a core network side, a short message to the UE, the control method characterized by including a transfer step of, when a SIP (Session Initiation Protocol) message is received, transferring, when the received SIP message is transmitted to a SMSC (Short Message Service Center), content of the SIP message to the SMSC and transferring, when the received SIP message is transmitted to a destination other than the SMSC, the content of the SIP message to an apparatus on the core network side.

A control method according to the present invention is a control method performed in a MAP (Mobile Application Part) gateway apparatus used in a communication system having a function of delivering a short message, the control method characterized by including a control step of transmitting, when MS Present information or SMMA (Short Message Memory Available) information is included in a received message, a message corresponding to the MS Present information or the SMMA information to a HLR (Home Location Register).

<Program>

A program according to the present invention is a program executed by a femtocell base station that connects UE (User Equipment) to a core network side, the program characterized by causing a computer to execute:

first transmission processing for converting, when information concerning a SMS (Short Message Service) is received from the UE, the received information concerning the SMS into a SIP (Session Initiation Protocol) message including the received information concerning the SMS and transmitting the converted SIP message to the core network side; and second transmission processing for converting, when a SIP message including information concerning the SMS is received from the core network side, the information concerning the SMS included in the received SIP message into a message that can be recognized by the UE and transmitting the converted information concerning the SMS to the UE.

A program according to the present invention is a program executed by a femtocell base station that connects UE (User Equipment) to a core network side, the program characterized by causing a computer to execute control processing for controlling ON and OFF of a flag used in controlling whether a SMS (Short Message Service) reaches the destination.

A program according to the present invention is a program executed by a short message gateway apparatus that transfers, via a femtocell base station that connects UE (User Equipment) to a core network side, a short message to the UE, the program characterized by causing a computer to execute transfer processing for, when a SIP (Session Initiation Protocol) message is received, transferring, when the received SIP message is transmitted to a SMSC (Short Message Service Center), content of the SIP message to the SMSC and transferring, when the received SIP message is transmitted to a destination other than the SMSC, the content of the SIP message to an apparatus on the core network side.

A program according to the present invention is a program executed by a MAP (Mobile Application Part) gateway apparatus used in a communication system having a function of delivering a short message, the program characterized by causing a computer to execute control processing for transmitting, when MS Present information or SMMA (Short Message Memory Available) information is included in a received message, a message corresponding to the MS Present information or the SMMA information to a HLR (Home Location Register).

Advantageous Effects of Invention

According to the present invention, it is possible to realize, in a communication system in which a femtocell base station is installed, the Short Message Service (SMS) provided in the existing 3G network.

BRIEF DESCRIPTION OF DRAWINGS

FIG. 11 is a diagram showing an example of an ERROR Code used in the existing 3G network.

FIG. 23 is a diagram showing an overview of delivery control for a short message performed in the Femto IMS network (Ready For SM (SMMA) failure case (error response)).

FIG. 24 is a diagram showing an overview of delivery control for a short message performed in the Femto IMS network (Ready For SM (SMMA) failure case (CN side no response, etc.).

FIG. 25 is a diagram showing a configuration example of a message for Ready For SM generated by the FAP.

DESCRIPTION OF EMBODIMENTS

Figure 1:
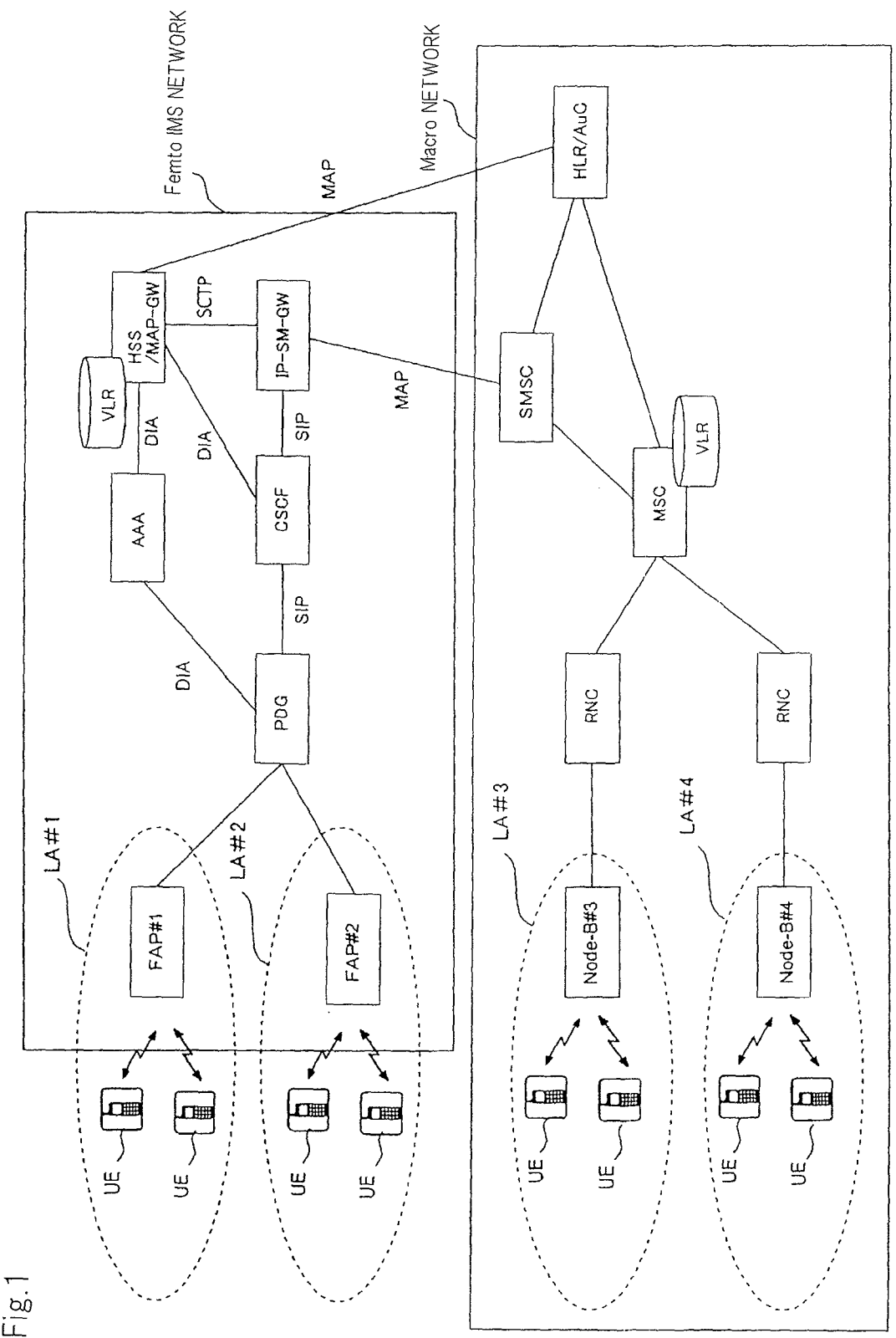
FIG. 1 is a diagram showing a system configuration example of a communication system according to an exemplary embodiment.

<System Configuration Example of a Communication System>

First, a system configuration example of a communication system according to an exemplary embodiment is explained with reference to FIG. 1.

The communication system according to the exemplary embodiment includes a Macro network and a Femto IMS (IP Multimedia subsystem) network.

The Macro network is the publicly-known existing 3G network. The Macro network includes UE (User Equipment), a Node-B, a RNC (Radio Network Controller), a MSC (Mobile Services Switching Centre), a VLR (Visitor Location Register), a SMSC (Short Message Service Center), and a HLR/AuC (Home Location Register/Authentication Centre).

The UE, the Node-B, the RNC, the MSC, the VLR, the SMSC, and the HLR/AuC included in the Macro network are apparatuses that perform processing conforming to the 3GPP. Therefore, specific processing operation of the apparatuses is not explained. A technique used in the existing Macro network (communication system) is disclosed in, for example, the 3GPP TS 33.234 V8.0.0 (2007-12). A technique concerning the Short Message Service (SMS) is disclosed in, for example, the 3GPP TS 23.040 V8.0.0 (2007-12).

The Femto IMS network includes a FAP (Femto Access Point), a PDG (Packet Data Gateway), an AAA (Authentication Authorization Accounting), a CSCF (Call Session Control Function), a HSS (Home Subscriber Server)/MAP-GW (Mobile Application Part-Gateway), a VLR (Visitor Location Register), and an IP-SM-GW (IP-Short Message-Gateway).

The FAP is a small radio base station (a femtocell base station) that covers a narrow communication area having a radius of about several tens meters.

The PDG is an apparatus that relays a message.

The CSCF is an apparatus as a central node in an IMS network and performs functions such as session control, management, authentication, and routing employing a SIP (Session Initiation Protocol).

The AAA is an apparatus that performs authentication between the UE and a network.

The HSS/MAP-GW is an apparatus that manages subscriber information of the UE used in the IMS. The HSS/MAP-GW performs communication employing protocols of MAP, Diameter, and SCTP (Stream Control Transmission protocol). For example, when the HSS/MAP-GW communicates with the HLR/AuC, the HSS/MAP-GW performs communication employing the MAP. When the HSS/MAP-GW communicates with the AAA and the CSCF, the HSS/MAP-GW performs communication employing the Diameter. When the HSS/MAP-GW communicates with the IP-SM-GW, the HSS/MAP-GW performs communication employing the protocol of the SCTP. The HSS/MAP-GW according to the exemplary embodiment has a MAP-GW (Mobile Application Part-Gateway) function for connecting a line by a protocol other than the MAP such as the Diameter and the SCTP and a line by the protocol of the MAP and mutually converting a signal by the protocol other than the MAP and a signal by the protocol of the MAP (a MAP-GW apparatus). In other words, in the HSS/MAP-GW according to the exemplary embodiment, the HSS has the MAP-GW function on the inside thereof.

The VLR is an apparatus that stores the subscriber information of the UE. The HSS/MAP-GW acquires the subscriber information of the UE from the HLR/AuC, stores the acquired subscriber information of the UE in the VLR, and manages the subscriber information.

The IP-SM-GW controls of the Short Message Service (SMS). The IP-SM-GW performs communication employing protocols of SIP, MAP, and SCTP. For example, when the IP-SM-GW communicates with the CSCF, the IP-SM-GW performs communication employing the SIP. When the IP-SM-GW communicates with the SMSC, the IP-SM-GW performs communication employing the MAP. When the IP-SM-GW communicates with the HSS/MAP-GW, the IP-SM-GW performs communication employing the SCTP. When the IP-SM-GW according to the exemplary embodiment receives a SIP message transmitted from the FAP, the IP-SM-GW discriminates, according to a value of a Protocol Discriminator of the SIP message, whether the received SIP message is a SMS (Short Message Service) or a service other than the SMS (SS; Supplementary Service, CheckIMEI, etc.). When the value of the Protocol Discriminator is the SMS, the IP-SM-GW discriminates whether a RP-Message Type is the SMMA or other than the SMMA.

When the value of the Protocol Discriminator is other than the SMS, the IP-SM-GW sets the HSS/MAP-GW as a transmission destination. When the value of the Protocol Discriminator is the SMS and the RP-Message Type is other than the SMMA, the IP-SM-GW sets the SMSC as a transmission destination. When the value of the Protocol Discriminator is the SMS and the RP-Message Type is the SMMA, the IP-SM-GW sets the HSS/MAP-GW as a transmission destination.

In the communication system that builds the Femto IMS network according to the exemplary embodiment, when the UE as a regular user moves to, for example, the inside of a LA (Location Area) (LA#2 shown in FIG. 1) under FAP#2, the UE passes through a White List of the FAP#2 and is received on a core network side. The messages are transmitted and received among the UE, the FAP#2, the PDG, the AAA, the HSS/MAP-GW, and the HLR/AuC and authentication processing for the UE is performed. When the authentication of the UE is successful, messages are transmitted and received among the UE, the FAP#2, the PDG, the CSCF, the HSS/MAP-GW, and the HLR/AuC. The CSCF manages the subscriber information (CS) of the UE in association with information concerning the FAP#2. The CSCF manages, in association with the information concerning the FAP#2, the subscriber information (CS) of the UE managed by the VLR of the HSS/MAP-GW. The CSCF registers the subscriber information (CS) of the UE in the FAP#2 and manages the subscriber information. The UE performs position registration of a PS service to perform processing same as position registration of the CS service. The FAP#2 manages the subscriber information (CS/PS) of the UE.

<Delivery Control for a Short Message Performed in the Existing 3G Network (the Macro Network)>

Figure 2:
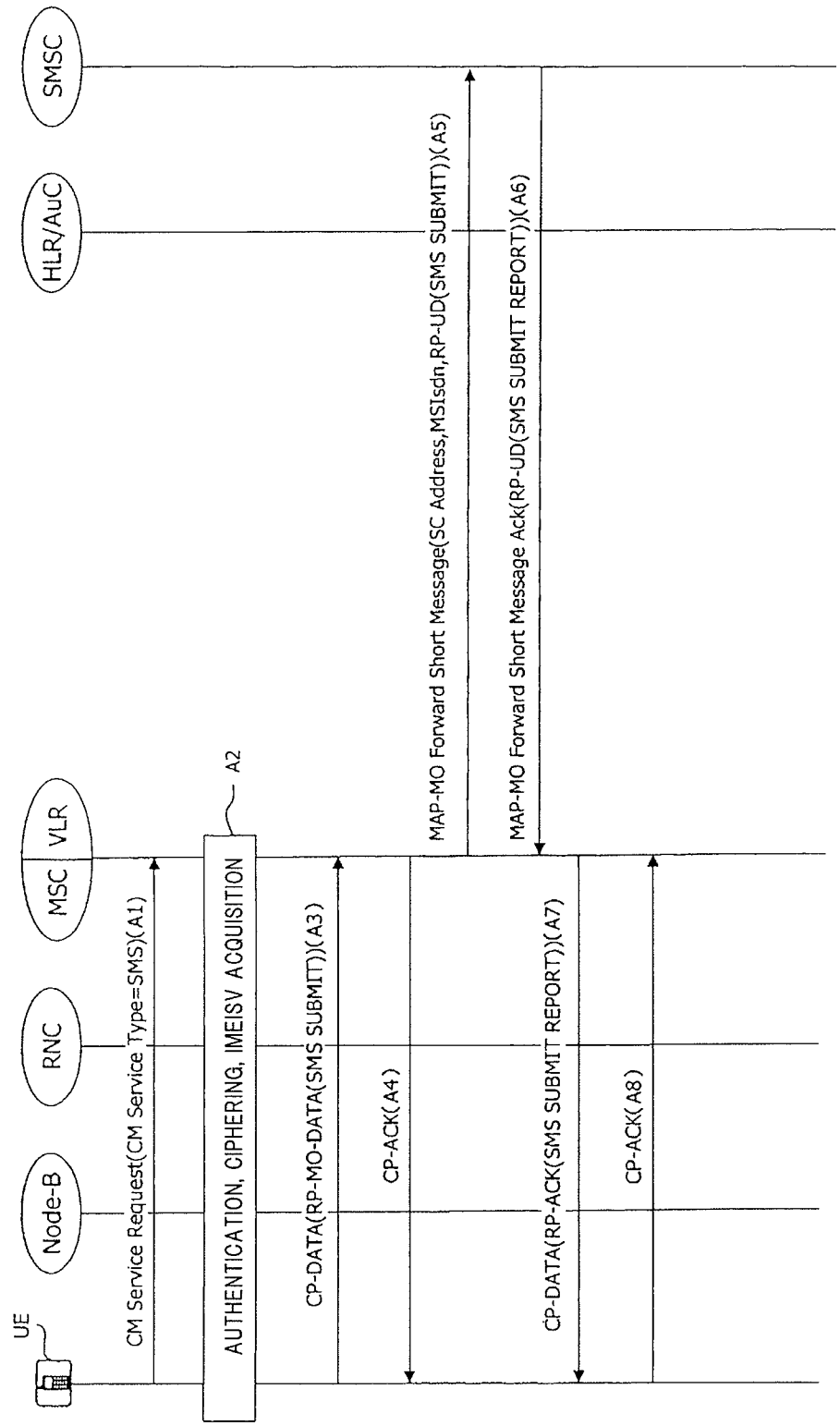
FIG. 2 is a diagram showing an overview of delivery control for a short message performed in the existing 3G network (the Macro network) (a processing operation example of SMS-MO).
Figure 3:
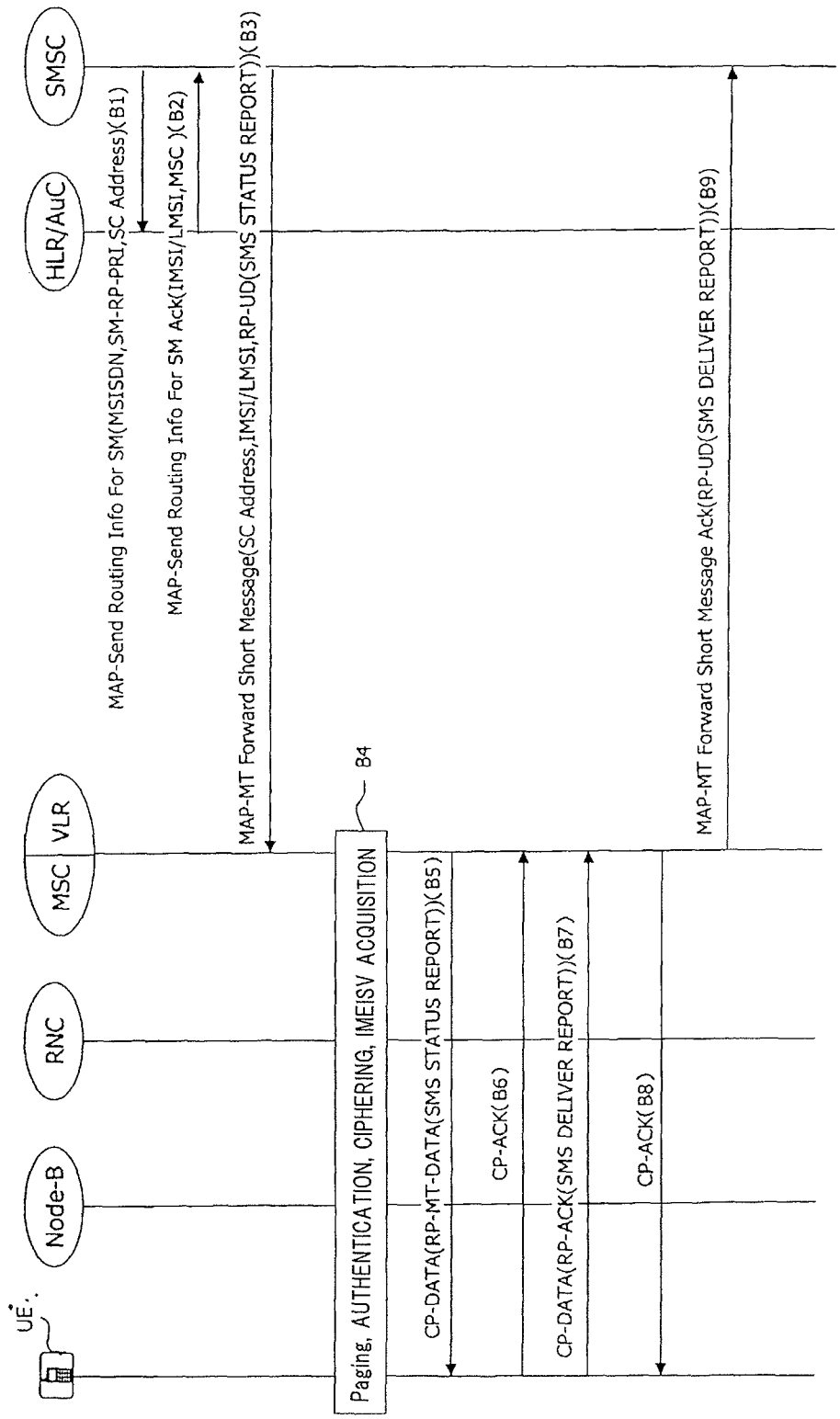
FIG. 3 is a diagram showing an overview of delivery control for a short message performed in the existing 3G network (the Macro network) (a processing operation example of delivery report).
Figure 4:
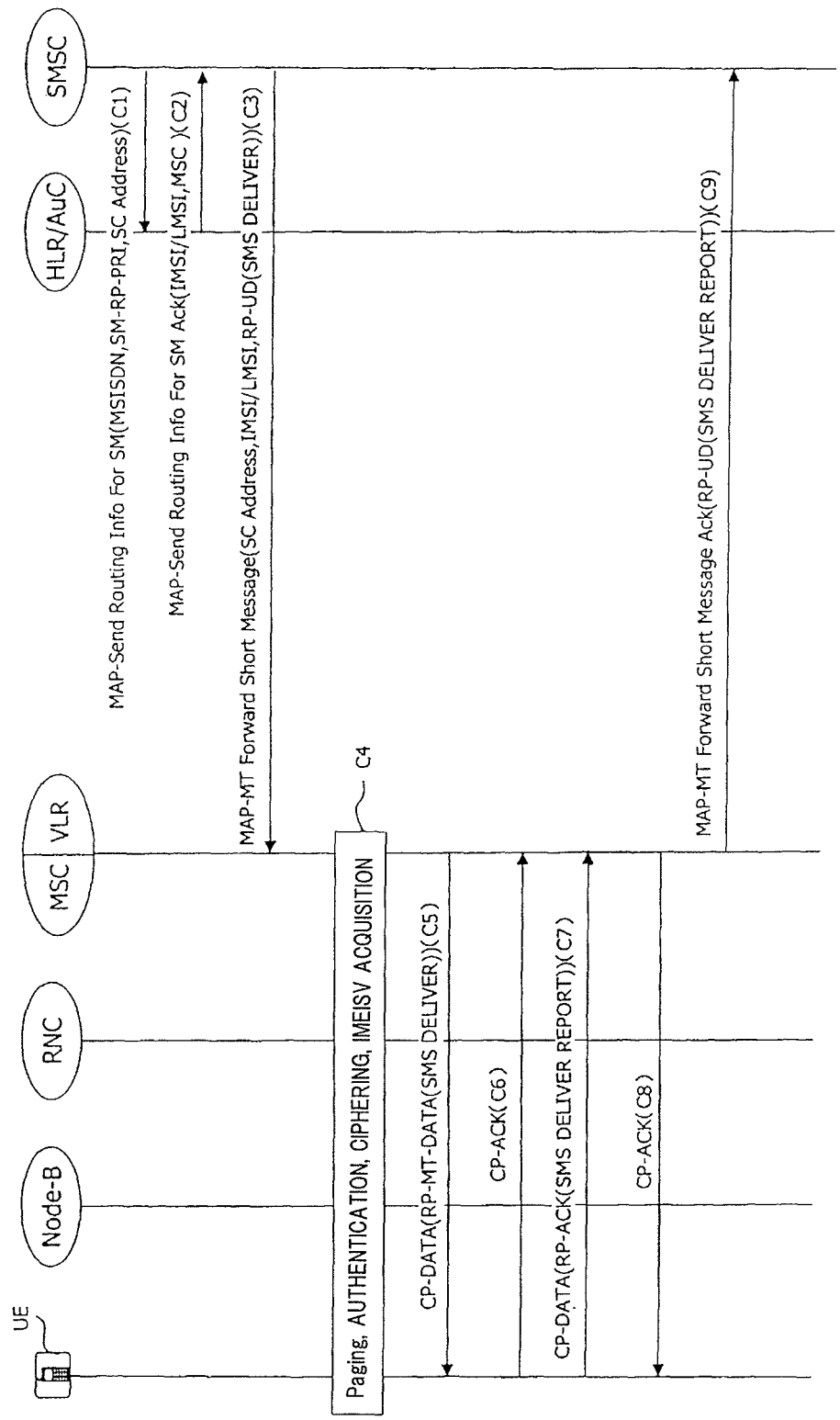
FIG. 4 is a diagram showing an overview of delivery control for a short message performed in the existing 3G network (the Macro network) (a processing operation example of SMS-MT).
Figure 5:
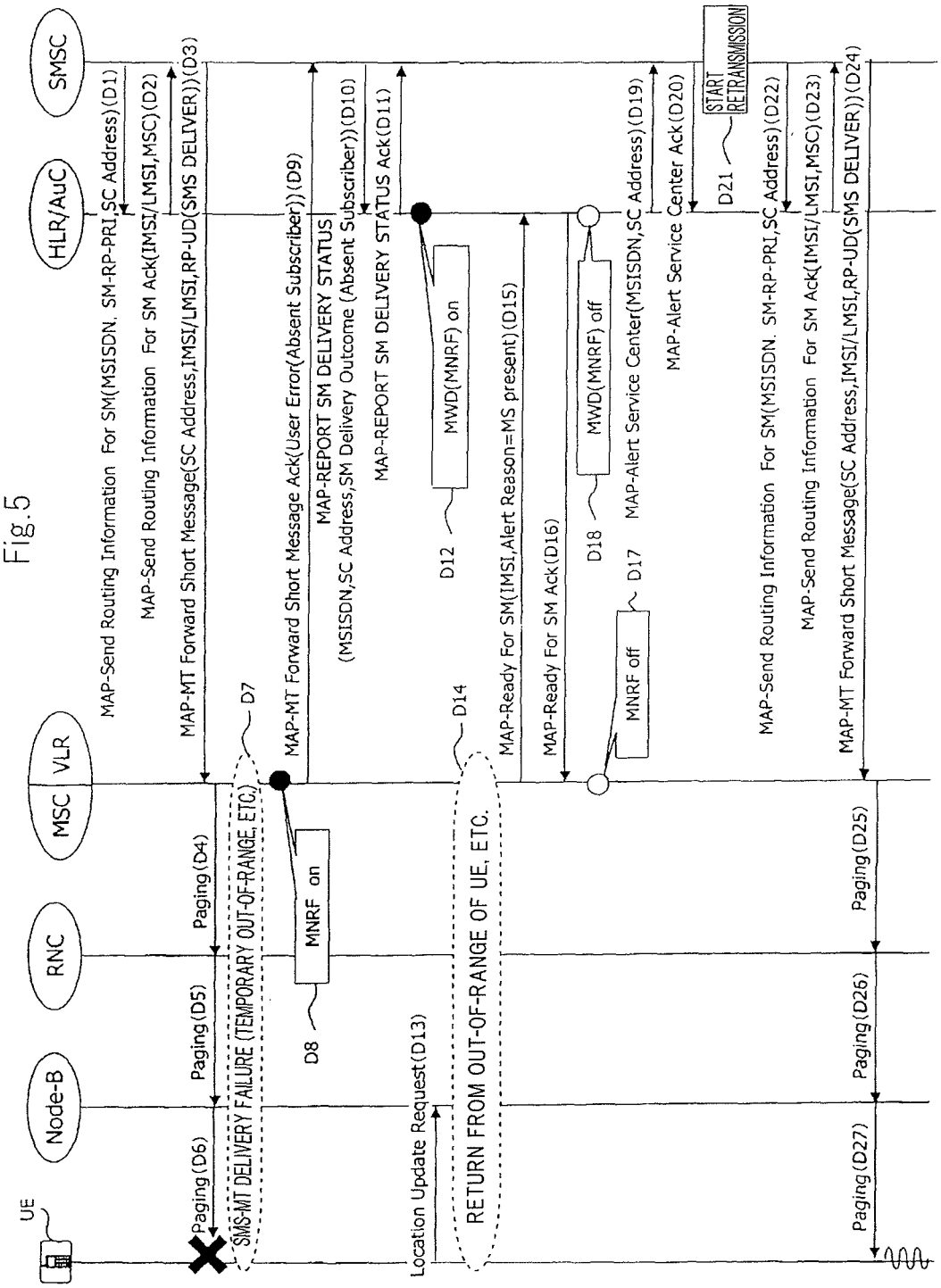
FIG. 5 is a diagram showing an overview of delivery control for a short message performed in the existing 3G network (the Macro network) (a processing operation example at the time of SMS-MT delivery failure due to UE being out-of-range or the like).
Figure 6:
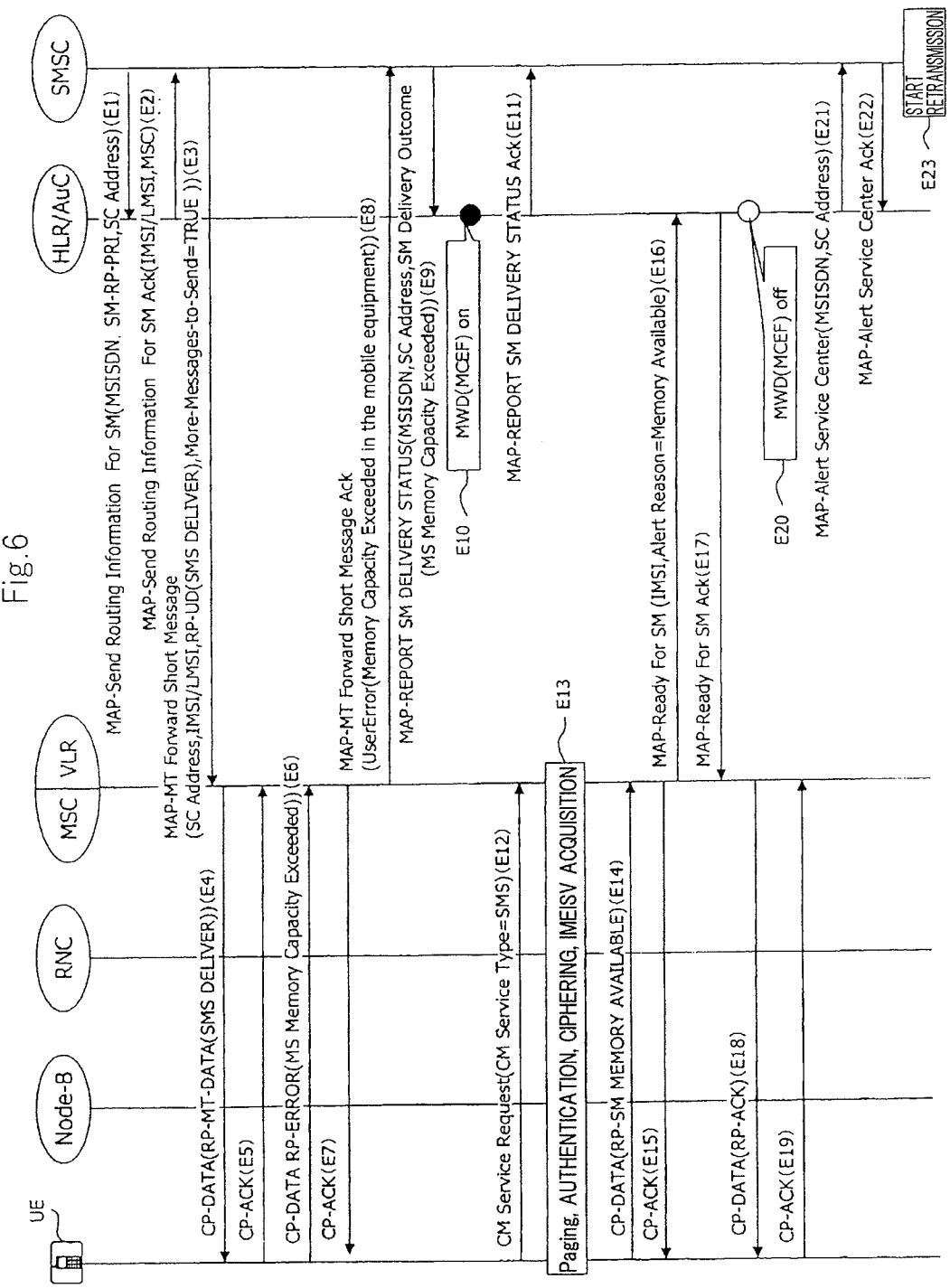
FIG. 6 is a diagram showing an overview of delivery control for a short message performed in the existing 3G network (the Macro network) (a processing operation example at the time of SMS-MT delivery failure due to insufficient memory in UE or the like).

Next, an overview of delivery control for a short message performed in the existing 3G network (the Macro network) is explained with reference to FIGS. 2 to 6. FIG. 2 shows a processing operation example of SMS-MO (Short Message Service Mobile Originated). FIG. 3 shows a processing operation example of delivery report. FIG. 4 shows a processing operation example of SMS-MT (Short Message Service Mobile Terminated). FIG. 5 shows a processing operation example at the time of SMS-MT delivery failure due to, for example, the UE being out-of-range. FIG. 6 shows a processing operation example at the time of SMS-MT delivery failure due to, for example, insufficient memory in the UE.

<Processing Operation of the SMS-MO>

First, a processing operation example of the SMS-MO is explained with reference to FIG. 2. The SMS-MO is a service for performing registration of a short message in the SMSC from the UE.

The UE transmits a CM Service Request (CM Service Type=SMS) to the MSC through the Node-B and the RNC (step A1).

When the MSC receives the CM Service Request (CM Service Type=SMS), the MSC performs processing for authentication, ciphering, and IMEISV acquisition between the MSC and the UE (step A2). The UE transmits CP-DATA (RP-MO-DATA (SMS SUBMIT)) to the MSC (step A3).

When the MSC receives the CP-DATA (RP-MO-DATA (SMS SUBMIT), the MSC transmits CP-ACK to the UE (step A4). The MSC transmits a MAP-MO Forward Short Message (SC Address, MSIsdn, RP-UD (SMS SUBMIT)) to the SMSC (step A5).

When the SMSC receives the MAP-MO Forward Short Message (SC Address, MSIsdn, RP-UD (SMS SUBMIT)), the SMSC transmits the MAP-MO Forward Short Message Ack (RP-UD (SMS SUBMIT REPORT)) to the MSC (step A6).

When the MSC receives the MAP-MO Forward Short Message Ack (RP-UD (SMS SUBMIT REPORT)), the MSC transmits CP-DATA (RP-ACK (SMS SUBMIT REPORT)) to the UE (step A7).

When the UE receives the CP-DATA (RP-ACK (SMS SUBMIT REPORT)), the UE transmits CP-ACK to the MSC (step A8).

In this way, in the transmission control for a short message performed in the existing 3G network, the UE performs registration (SMS SUBMIT) of the short message in the SMSC through the MSC (steps A1 to A5). The UE receives a registration result (SMS SUBMIT REPORT) of the short message from the SMSC (steps A6 to A8). After delivering the short message registered from the UE, the SMSC transmits a report of success/failure concerning the delivery of the short message (a delivery report) to the UE.

<Processing Operation for Delivery Report>

Next, a processing operation example of delivery report is explained with reference to FIG. 3. The delivery report is a service for transmitting a report of success/failure concerning delivery of a short message registered in the SMSC (a delivery report) to the UE.

The SMSC transmits MAP-Send Routing Information for Short Message (MSISDN, SM-RP-PRI, SC Address) to the HLR/AuC (step B1).

When the HLR/AuC receives the MAP-Send Routing Information For Short Message (MSISDN, SM-RP-PRI, SC Address), the HLR/AuC transmits MAP-Send Routing Information For Short Message Ack (IMSI/LMSI, MSC) to the SMSC (step B2).

When the SMSC receives the MAP-Send Routing Information For Short Message Ack (IMSI/LMSI, MSC), the SMSC transmits a MAP-MT Forward Short Message (SC Address, IMSI/LMSI, RP-UD (SMS STATUS REPORT)) to the MSC (step B3).

When the MSC receives the MAP-MT Forward Short Message (SC Address, IMSI/LMSI, RP-UD (SMS STATUS REPORT)), the MSC performs processing for Paging, authentication, ciphering, and IMEISV acquisition between the MSC and the UE (step B4) and transmits CP-DATA (RP-MT-DATA (SMS STATUS REPORT)) to the UE (step B5).

When the UE receives the CP-DATA (RP-MT-DATA (SMS STATUS REPORT)), the UE transmits CP-ACK to the MSC (step B6).

The UE transmits CP-DATA (RP-ACK (SMS DELIVER REPORT)) to the MSC (step B7).

When the MSC receives the CP-DATA (RP-ACK (SMS DELIVER REPORT)), the MSC transmits CP-ACK to the UE (step B8). The MSC transmits MAP-MT Forward Short Message Ack (RP-UD (SMS DELIVER REPORT)) to the SMSC (step B9).

In this way, in the transmission control for a short message performed in the existing 3G network, the SMSC transmits a delivery report for the short message (SMS STATUS REPORT) to the UE through the MSC (steps B1 to B6). The SMSC receives a delivery result of the short message (SMS DELIVER REPORT) from the UE (steps B7 to B9).

<Processing Operation of the SMS-MT>

Next, a processing operation example of the SMS-MT is explained with reference to FIG. 4. The SMS-MT is a service for performing delivery of a short message from the SMSC to the UE.

The SMSC transmits MAP-Send Routing Information For Short Message (MSISDN, SM-RP-PRI, SC Address) to the HLR/AuC (step C1).

When the HLR/AuC receives the MAP-Send Routing Information For Short Message (MSISDN, SM-RP-PRI, SC Address), the HLR/AuC transmits MAP-Send Routing Information For Short Message Ack (IMSI/LMSI, MSC) to the SMSC (step C2).

When the SMSC receives the MAP-Send Routing Information For Short Message Ack (IMSI/LMSI, MSC), the SMSC transmits a MAP-MT Forward Short Message (SC Address, IMSI/LMSI, RP-UD (SMS DELIVER)) to the MSC (step C3).

When the MSC receives the MAP-MT Forward Short Message (SC Address, IMSI/LMSI, RP-UD (SMS DELIVER)), the MSC performs processing for Paging, authentication, ciphering, and IMEISV acquisition between the MSC and the UE (step C4) and transmits CP-DATA (RP-MT-DATA (SMS DELIVER)) to the UE (step C5).

When the UE receives the CP-DATA (RP-MT-DATA (SMS DELIVER), the UE transmits CP-ACK to the MSC (step C6).

The UE transmits CP-DATA (RP-ACK (SMS DELIVER REPORT)) to the MSC (step C7).

When the MSC receives the CP-DATA (RP-ACK (SMS DELIVER REPORT)), the MSC transmits CP-ACK to the UE (step C8). The MSC transmits MAP-MT Forward Short Message Ack (RP-UD (SMS DELIVER REPORT)) to the SMSC (step C9).

In this way, in the transmission control for a short message performed in the existing 3G network, the SMSC performs delivery of the short message (SMS DELIVER) to the UE through the MSC (steps C1 to C6). The SMSC receives a delivery result (SMS DELIVER REPORT) of the short message from the UE (steps C7 to C9).

<Processing Operation at the Time of SMS-MT Delivery Failure Due to, for Example, the UE Being Out-of-Range>

Next, a processing operation example at the time of SMS-MT delivery failure due to, for example, the UE being out-of-range is explained with reference to FIG. 5.

The SMSC transmits MAP-Send Routing Information For Short Message (MSISDN, SM-RP-PRI, SC Address) to the HLR/AuC (step DD.

When the HLR/AuC receives the MAP-Send Routing Information For Short Message (MSISDN, SM-RP-PRI, SC Address), the HLR/AuC transmits MAP-Send Routing Information For Short Message Ack (IMSI/LMSI, MSC) to the SMSC (step D2).

When the SMSC receives the MAP-Send Routing Information For Short Message Ack (IMSI/LMSI, MSC), the SMSC transmits MAP-MT Forward Short Message (SC Address, IMSI/LMSI, RP-UD (SMS DELIVER)) to the MSC (step D3).

When the MSC receives the MAP-MT Forward Short Message (SC Address, IMSI/LMSI, RP-UD (SMS DELIVER)), the MSC transmits Paging to the UE via the RNC and the Node-B (step D4 to D6).

When the MSC cannot receive a Paging Response even when a predetermined time elapses after Paging is transmitted to the UE (Paging Response Time Out), the MSC determines that SMS-MT delivery has failed (step D7). In this case, the MSC sets a MNRF (Mobile-Station-Not-Reachable-Flag) to ON (step D8) and transmits MAP-MT Forward Short Message Ack (User Error (Absent Subscriber)) to the SMSC (step D9).

When the SMSC receives the MAP-MT Forward Short Message Ack (User Error (Absent Subscriber)), the SMSC transmits a MAP-REPORT SM DELIVERY STATUS (MSISDN, SC Address, SM Delivery Outcome (Absent Subscriber)) to the HLR/AuC (step D10).

When the HLR/AuC receives the MAP-REPORT SM DELIVERY STATUS (MSISDN, SC Address, SM Delivery Outcome (Absent Subscriber)), the HLR/AuC transmits MAP-REPORT SM DELIVERY STATUS Ack to the SMSC (step D11).

The HLR/AuC sets the MNRF of MWD (Messages-Waiting-Data) to ON (step D12).

Thereafter, when the UE transmits a Location Update Request to the Node-B (step D13) and the MSC detects, for example, return from out-of-range of the UE (step D14), the UE transmits a MAP-Ready For Short Message (IMSI, Alert Reason=MS present) to the HLR/AuC (step D15).

When the HLR/AuC receives the MAP-Ready For Short Message (IMSI, Alert Reason=MS present), the HLR/AuC transmits MAP-Ready For SM Ack to the MSC (step D16).

When the MSC receives the MAP-Ready For SM Ack, the MSC sets the MNRF, which is set to ON in step D8, to OFF (step D17).

When the HLR/AuC receives the MAP-Ready For Short Message (IMSI, Alert Reason=MS present), the HLR/AuC sets the MNRF of the MWD (Messages-Waiting-Data), which is set to ON in step D12, to OFF (step S18) and transmits a MAP-Alert Service Center (MSISDN, SC Address) to the SMSC (step D19).

When the SMSC receives the MAP-Alert Service Center (MSISDN, SC Address), the SMSC transmits MAP-Alert Service Center Ack to the HLR/AuC (step D20).

When the SMSC receives the MAP-Alert Service Center (MSISDN, SC Address), the SMSC starts retransmission of a Short Message (step D21) and performs processing same as the processing in steps D1 to D6 (steps D22 to D27).

In this way, in the transmission control for a short message performed in the existing 3G network, when SMS-MT delivery fails due to a cause such as the UE being out-of-range (step D7), the delivery impossible flag (MNRF) of the VLR of the MSC or the MWD of the HLR is set to ON (steps D8 and D12). When the UE returns from out-of-range (step D14), the delivery impossible flag (MNRF) of the VLR of the MSC or the MWD of the HLR set to ON is set to OFF (steps D17 and D18). Retransmission of a short message to the UE is started (step D21).

<Processing Operation at the Time Of SMS-MT Delivery Failure due to, for Example, Insufficient Memory in the UE>

Next, a processing operation example at the time of SMS-MT delivery failure due to, for example, insufficient memory in the UE is explained with reference to FIG. 6.

The SMSC transmits MAP-Send Routing Information For Short Message (MSISDN, SM-RP-PRI, SC Address) to the HLR/AuC (step E1).

When the HLR/AuC receives the MAP-Send Routing Information For Short Message (MSISDN, SM-RP-PRI, SC Address), the HLR/AuC transmits MAP-Send Routing Information For Short Message Ack (IMSI/LMSI, MSC) to the SMSC (step E2).

When the SMSC receives the MAP-Send Routing Information For Short Message Ack (IMSI/LMSI, MSC), the SMSC transmits a MAP-MT Forward Short Message (SC Address, IMSI/LMSI, RP-UD (SMS DELIVER), More-Messages-to-Send=TRUE)) to the MSC (step E3).

When the MSC receives the MAP-MT Forward Short Message (SC Address, IMSI/LMSI, RP-UD (SMS DELIVER), More-Messages-to-Send=TRUE), the MSC transmits CP-DATA (RP-MT-DATA (SMS DELIVER) to the UE (step E4).

When the UE receives the CP-DATA (RP-MT-DATA (SMS DELIVER), the UE transmits CP-ACK to the MSC (step E5).

When memory insufficiency occurs, the UE transmits CP-DATA RP-ERROR (MS Memory Capacity Exceeded)) to the MSC (step E6).

When the MSC receives the CP-DATA RP-ERROR (MS Memory Capacity Exceeded), the MSC transmits CP-ACK to the UE (step E7).

When the MSC receives the CP-DATA RP-ERROR (MS Memory Capacity Exceeded)), the MSC transmits MAP-MT Forward Short Message Ack (UserError (Memory Capacity Exceeded in the mobile equipment)) to the SMSC (step E8).

When the SMSC receives the MAP-MT Forward Short Message Ack (UserError (Memory Capacity Exceeded in the mobile equipment)), the SMSC transmits MAP-REPORT SM DELIVERY STATUS (MSISDN, SC Address, SM Delivery Outcome (MS Memory Capacity Exceeded)) to the HLR/AuC (step E9).

When the HLR/AuC receives the MAP-REPORT SM DELIVERY STATUS (MSISDN, SC Address, SM Delivery Outcome (MS Memory Capacity Exceeded)), the HLR/AuC sets a MCEF (Mobile-Station-Memory-Capacity-Exceeded-Flag) of the MWD (Messages-Waiting-Data) to ON (step E10).

The HLR/AuC transmits MAP-REPORT SM DELIVERY STATUS Ack to the SMSC (step E11).

Thereafter, the UE transmits a CM Service Request (CM Service Type=SMS) to the MSC (step E12) and performs processing for Paging, authentication, ciphering, and IMEISV acquisition between the UE and the MSC (step E13).

When the memory insufficiency is eliminated, the UE transmits CP-DATA (RP-SM MEMORY AVAILABLE) to the MSC (step E14).

When the MSC receives the CP-DATA (RP-SM MEMORY AVAILABLE), the MSC transmits CP-ACK to the UE (step E15).

The MSC transmits MAP-Ready For SM (IMSI, Alert Reason=Memory Available) to the HLR/AuC (step E16).

When the HLR/AuC receives the MAP-Ready For SM (IMSI, Alert Reason=Memory Available), the HLR/AuC transmits MAP-Ready For SM Ack to the MSC (step E17).

When the MSC receives the MAP-Ready For SM Ack, the MSC transmits CP-DATA (RP-ACK) to the UE (step E18).

When the UE receives the CP-DATA (RP-ACK), the UE transmits the CP-ACK to the MSC (step E19).

When the HLR/AuC receives the MAP-Ready For SM (IMSI, Alert Reason=Memory Available), the HLR/AuC sets the MCEF of the MWD (Messages-Waiting-Data), which is set to ON in step E10, to OFF (step E20) and transmits MAP-Alert Service Center (MSISDN, SC Address) to the SMSC (step E21).

When the SMSC receives the MAP-Alert Service Center (MSISDN, SC Address), the SMSC transmits MAP-Alert Service Center Ack to the HLR/AuC (step E22).

When the SMSC receives the MAP-Alert Service Center, the SMSC starts retransmission of a Short Message (step E23).

In this way, in the transmission control for a short message performed in the existing 3G network, when SMS-MT delivery fails due to a cause such as insufficient memory in the UE (step E6), the delivery impossible flag (MCEF) of the MWD (Messages-Waiting-Data) of the HLR is set to ON (step E10). When the insufficient memory in the UE is eliminated (step E14), the delivery impossible flag (MCEF) set to ON in the MWD of the HLR is set to OFF (step E20).

Retransmission of a short message to the UE is started (step E23).

The processing shown in FIGS. 2 to 6 is delivery control for a short message performed in the existing 3G network (the Macro network). If it is attempted to realize, in the Femto IMS network, the delivery control for a short message performed in the existing 3G network, since a system configuration for building the existing 3G network and a system configuration for building the Femto IMS network are different, the delivery control for a short message explained above cannot be directly used in the Femto IMS network.

Therefore, in a system in which the Femto IMS network is built, it is necessary to build a mechanism for realizing delivery control same as that for a short message performed in the existing 3G.

Consequently, as a result of attempting various improvements and earnestly repeated researches, the inventor found that a method explained below is adopted.

Specifically, communication conforming to the 3GPP performed between the UE and the MSC is performed as communication between the UE and the FAP. When the FAP receives information concerning the SMS (information conforming to the 3GPP) from the UE, the FAP maps the received information concerning the SMS to a SIP message and transmits the mapped SIP message to the IP-SM-GW. When the IP-SM-GW receives the SIP message, if the Protocol Discriminator is the SMS and the RP-Message Type is other than the SMMA, the IP-SM-GW sets the SMSC as a transmission destination and maps the received SIP message to a MAP message. The IP-SM-GW transmits the mapped MAP message to the SMSC and circulates the information concerning the SMS, which is transmitted from the UE, to the SMSC. When the IP-SM-GW receives the information concerning the SMS from the SMSC, the IP-SM-GW maps the received information concerning the SMS to the SIP message and transmits the mapped SIP message to the FAP. When the FAP receives the SIP message, the FAP converts the received SIP message into information conforming to the 3GPP, transmits the converted information concerning the SMS to the UE, and circulates the information concerning the SMS, which is transmitted from the SMSC, to the UE.

When the IP-SM-GW receives the SIP message and the Protocol Discriminator is SMS and the RP-Message Type is the SMMA, the IP-SM-GW sets the HSS/MAP-GW as a transmission destination and maps the received SIP message to a SCTP message. The IP-SM-GW transmits the mapped SCTP message to the HSS/MAP-GW and circulates the information concerning the SMS, which is transmitted from the UE, to the HLR/AuC via the HSS/MAP-GW. When the IP-SM-GW receives the information concerning the SMS, which is transmitted from the HLR/AuC, from the HSS/MAP-GW, the IP-SM-GW maps the received information concerning the SMS to the SIP message and transmits the mapped SIP message to the FAP. When the FAP receives the SIP message, the FAP converts the received SIP message into information conforming to the 3GPP, transmits the converted information concerning the SMS to the UE, and circulates the information concerning the SMS, which is transmitted from the HLR/AuC, to the UE.

The MNRF (Mobile-Station-Not-Reachable-Flag) is provided in the FAP that can easily grasp an out-of-range state of the UE. When the FAP detects the UE being out-of-range during delivery of a short message, the FAP sets the MNRF to ON and shifts the MNRF to a state indicating that the SMS (Short Message Service) is unreachable. When the UE returns from out-of-range, the FAP notifies the HLR/AuC of MS Present information via the PDG, the CSCF, the IP-SM-GW, and the HSS/MAP-GW. When the FAP receives ACK (RP-ACK) to the MS Present information via the HLR/AuC, the HSS/MAP-GW, the IP-SM-GW, the CSCF, and the PDG, the FAP sets the MNRF to OFF and shifts the MNRF to a state in which the SMS is reachable. When the HLR/AuC receives the MS Present information, the HLR/AuC notifies the SMSC of a retransmission request for a short message. When the SMSC receives the retransmission request for a short message from the HLR/AuC, the SMSC starts retransmission of a short message and delivers the short message to the UE via the IP-SM-GW, the CSCF, the PDG, and the FAP.

When the FAP receives, from the UE, information indicating that the insufficient memory in the UE occurs, the FAP notifies the HLR/AuC of the information to that effect via the PDG, the CSCF, the IP-SM-GW, and the SMSC. When the HLR/AuC receives the information indicating that the insufficient memory in the UE occurs, the HLR/AuC sets the MCEF (Mobile-Station-Memory-Capacity-Exceeded-Flag) of the MWD (Messages-Waiting-Data) to ON. When the FAP receives, from the UE, information indicating that the insufficient memory in the UE is eliminated, the FAP notifies the HLR/AuC of the information to that effect via the PDG, the CSCF, the IP-SM-GW, and the HSS/MAP-GW. When the HLR/AuC receives the information indicating that the insufficient memory in the UE is eliminated, the HLR/AuC sets the MCEF to OFF. The HLR/AuC notifies the SMSC of a retransmission request for a short message. When the SMSC receives a reproduction request for a short message from the HLR/AuC, the SMSC delivers the short message to the UE via the IP-SM-GW, the CSCF, the PDG, and the FAP. The circulation of the MS Present information and the circulation of the information concerning memory insufficiency are performed as separate processing operations.

Consequently, even in the case of the new communication system shown in FIG. 1 in which the FAP is installed, it is possible to perform delivery control same as that for a short message performed in the existing 3G. Delivery control for a short message performed in the Femto IMS network according to the exemplary embodiment is explained in detail below with reference to the drawings.

<Processing Operation of the SMS-MO>

Figure 7:
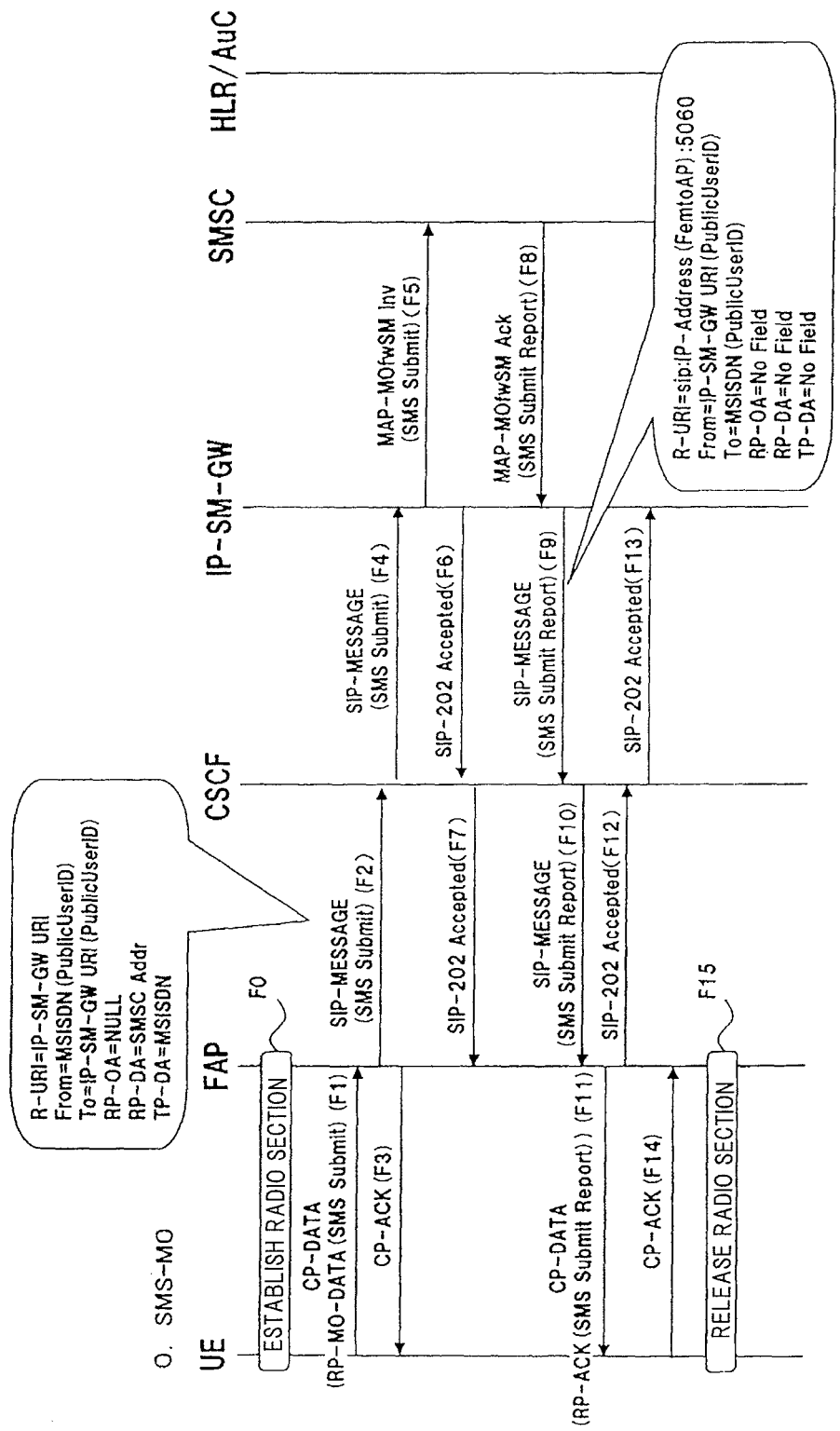
FIG. 7 is a diagram showing an overview of delivery control for a short message performed in a Femto IMS network (a processing operation example of SMS-MO).

First, a processing operation example of the SMS-MO is explained with reference to FIG. 7. The SMS-MO is a service for registering a short message in the SMSC from the UE.

In a state in which a radio section is established between the UE and the FAP (step F0), the UE transmits CP-DATA (RP-MO-DATA (SMS Submit)) to the FAP (step F1). When the FAP receives the CP-DATA (RP-MO (SMS Submit) transmitted from the UE, the FAP converts the received information (SMS Submit) into a SIP message and transmits the converted SIP message (SIP-MESSAGE (SMS Submit)) to the CSCF with the SIP message addressed to the IP-SM-GW (step F2). The SIP message includes, as shown in FIG. 7, information of R-URI=IP-SM-GW URI, From=MSISDN (PublicUserID), To=IP-SM-GW URI(PublicUserID), RP-OA=NULL, RP-DA=SMSC Addr, and TP-DA=MSISDN. The FAP transmits CP-ACK to the UE (step F3).

When the CSCF receives the SIP-MESSAGE (SMS Submit), the CSCF transmits the received SIP-MESSAGE (SMS Submit) to the IP-SM-GW (step F4).

When the IP-SM-GW receives the SIP-MESSAGE (SMS Submit), since the Protocol Discriminator is the SMS and the RP-Message Type is other than the SMMA, the IP-SM-GW maps the SIM-MESSAGE (SMS Submit) to a MAP message and transmits the mapped MAP message (MAP-MO Forward Short Message invocation (SMS Submit); MAP-MO FW SM inv (SMS Submit)) to the SMSC (step F5).

When the SMSC receives the MAP-MO FW SM inv (SMS Submit), the SMSC transmits MAP-MO FW SM Ack (SMS Submit Report) to the IP-SM-GW (step F8).

When the IP-SM-GW receives the MAP-MO FW SM Ack (SMS Submit Report), the IP-SM-GW converts the received information (SMS Submit Report) into a SIP message and transmits the converted SIP message ((SIP-MESSAGE (SMS Submit Report)) to the CSCF with the SIP message addressed to the FAP (step F9). The SIP message includes, as shown in FIG. 7, information of R-URI=sip:IP-Address(FemtoAP):5060, From=IP-SM-GW URI(PublicUser ID), To=MSISDN PublicUser ID), RP=OA=No Field, and RP=DA=No Field, TP-DA=No Field.

When the CSCF receives the SIP-MESSAGE (SMS Submit Report), the CSCF transmits the received SIP-MESSAGE (SMS Submit Report) to the FAP (step F10).

When the FAP receives the SIP-MESSAGE (SMS Submit Report), the FAP converts the received information (SMS Submit Report) into information conforming to the 3GPP and transmits the converted information (CP-DATA (RP-ACK (SMS Submit Report)) to the UE (step F11).

When the UE receives the CP-DATA (RP-ACK (SMS Submit Report)), the UE transmits CP-ACK to the FAP (step F14). When the FAP receives the CP-ACK, the FAP releases the radio section established between the UE and the FAP (step F15).

In this way, when the FAP receives the information concerning the SMS (SMS Submit) from the UE in a state in which the radio section is established with the UE, the FAP maps the received information concerning the SMS to a SIP message and transmits the mapped SIP message to the IP-SM-GW. When the IP-SM-GW receives the SIP message and discriminates that the received SIP message is addressed to the SMSC, the IP-SM-GW maps the received SIP message to a MAP message and transmits the mapped MAP message to the SMSC. This makes it possible to circulate the information concerning the SMS, which is transmitted from the UE, to the SMSC. Therefore, the UE can register a short message in the SMSC via the FAP (SMS Submit) (steps F1 to F5). When the IP-SM-GW receives the information concerning the SMS (SMS Submit Report) from the SMSC, the IP-SM-GW maps the received information concerning the SMS to the SIP message and transmits the mapped SIP message to the FAP. When the FAP receives the SIP message, the FAP converts the received SIP message into information conforming to the 3GPP and transmits the converted information concerning the SMS to the UE. This makes it possible to circulate the information concerning the SMS, which is transmitted from the SMSC, to the UE. Therefore, the UE can receive a registration result of the short message (SMS Submit Report) from the SMSC (steps F8 to F11). The SMSC transmits, after delivering the short message registered from the UE, a report of success/failure concerning the delivery of the short message (a delivery report) to the UE.

<Processing Operation of Delivery Report>

Figure 8:
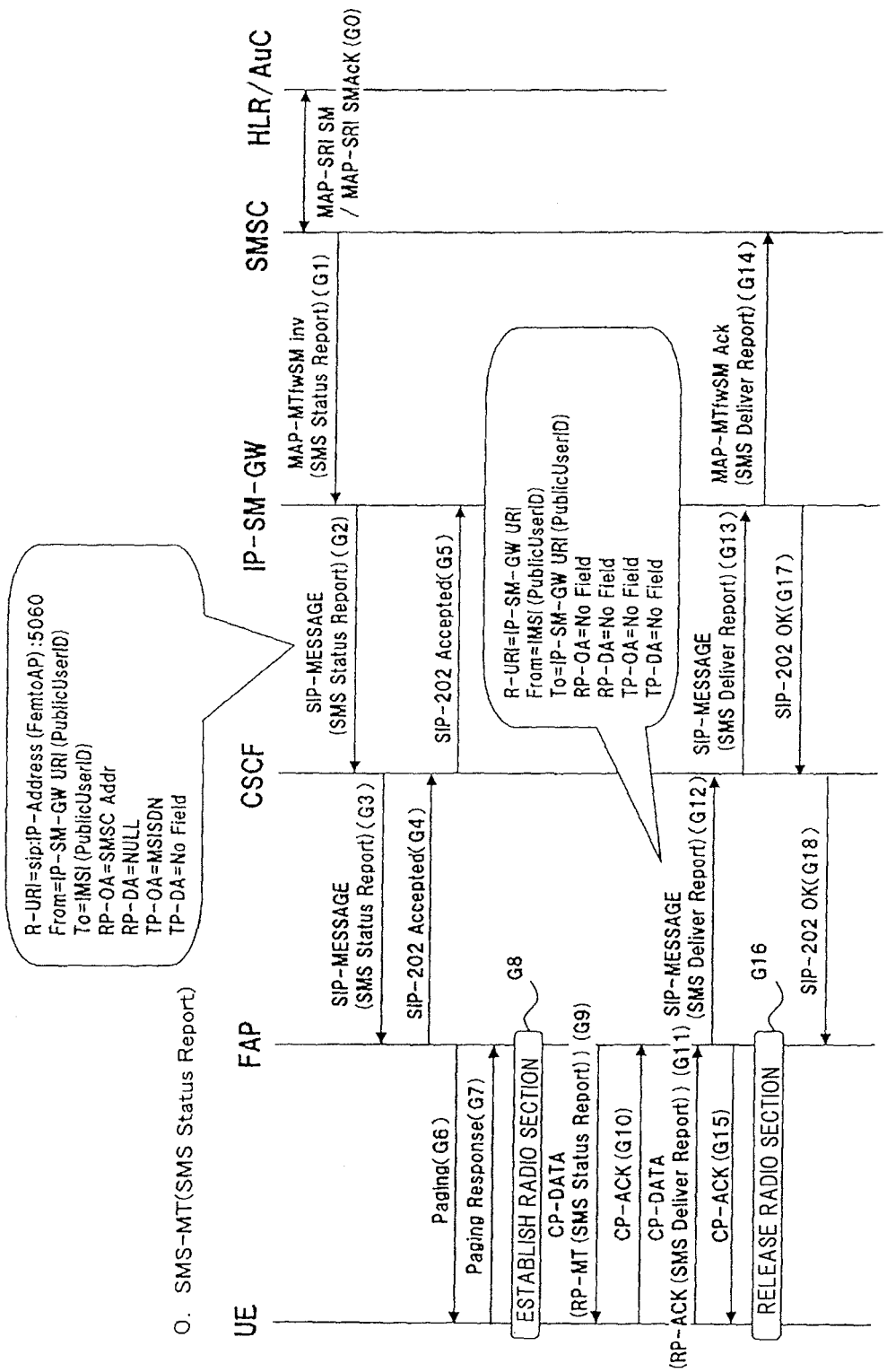
FIG. 8 is a diagram showing an overview of delivery control for a short message performed in the Femto IMS network (a processing operation example of delivery report).

Next, a processing operation example of delivery report is explained with reference to FIG. 8. The delivery report is a service for transmitting a report of success/failure concerning delivery of a short message registered in the SMSC (a delivery report) to the UE.

The SMSC transmits MAP-Send Routing Information For Short Message (MAP-SRI SM) to the HLR/AuC. The HLR/AuC transmits MAP-Send Routing Information For Short Message Ack (MAP-SRI SMAcK) to the SMSC (step G0).

When the SMSC receives the MAP-SRI SMAcK, the SMSC transmits MAP-Message Type Forward Short Message invocation (SMS Status Report); MAP-MTfwSM inv (SMS Status Report) to the IP-SM-GW (step G1).

When the IP-SM-GW receives the MAP-MTfwSM inv (SMS Status Report), the IP-SM-GW converts the received information (SMS Status Report) into a SIP message and transmits the converted SIP message (SIP-MESSAGE (SMS Status Report)) to the CSCF with the SIP message addressed to the FAP (step G2). The SIP message includes, as shown in FIG. 8, information of R-URI=sip:IP-Address(FemtoAP):5060, From=IP-SM-GW URI(PublicUserID), To=IMSI (PublicUserID), RP-OA=SMSC Addr, RP-DA=NULL, TP-OA=MSISDN, and TP-DA=No Field.

When the CSCF receives the SIP-MESSAGE (SMS Status Report), the CSCF transmits the SIP-MESSAGE (SMS Status Report) to the FAP (step G3).

When the FAP receives the SIP-MESSAGE (SMS Status Report), the FAP transmits SIP-202 Accepted to the CSCF (step G4).

When the CSCF receives the SIP-202 Accepted, the CSCF transmits the SIP-202 Accepted to the IP-SM-GW (step G5).

When the FAP receives the SIP-MESSAGE (SMS Status Report), the FAP sets a Paging Response waiting timer and transmits Paging to the UE (step G6).

When the UE receives the Paging, the UE transmits a Paging Response to the FAP (step G7) and establishes a radio section between the UE and the FAP (step G8).

When the radio section is established, the FAP converts the information concerning the SMS (SMS Status Report) included in the SIP-MESSAGE into information conforming to the 3GPP and transmits the converted information (CP-DATA (RP-MT(SMS Status Report)) to the UE (step G9).

When the UE receives the CP-DATA (RP-MT(SMS Status Report)), the UE transmits CP-ACK to the FAP (step G10).

The UE transmits CP-DATA (RP-ACK(SMS Deliver Report)) to the FAP (step G11). When the FAP receives the CP-DATA (RP-ACK(SMS Deliver Report)), the FAP converts the received information (SMS Deliver Report) into a SIP message and transmits the converted SIP message (SIP-MESSAGE (SMS Deliver Report)) to the CSCF with the SIP message addressed to the IP-SM-GW (step G12). The SIP message includes, as shown in FIG. 8, information of R-URI=IP-SM-GW URI, From=IMSI(PublicUserID), To=IP-SM-GW URI(PublicUserID), RP-OA=No Field, RP-DA=No Field, TP-OA-No Field, and TP-DA=No Field.

The FAP transmits CP-ACK to the UE (step G15) and releases the radio section established between the UE and the FAP (step G16).

When the CSCF receives the SIP-MESSAGE (SMS Deliver Report), the CSCF transmits the received SIP-MESSAGE (SMS Deliver Report) to the IP-SM-GW (step G13).

When the IP-SM-GW receives the SIP-MESSAGE (SMS Deliver Report), since the Protocol Discriminator is the SMS and the RP-Message Type is other than the SMMA, the IP-SM-GW maps the SIM-MESSAGE (SMS Deliver Report) to a MAP message and transmits the mapped MAP message (MAP-MT Forward Short Message Ack (SMS Deliver Report); MAP-MT FW SM Ack (SMS Deliver Report)) to the SMSC (step G14).

The IP-SM-GW transmits SIP-202 OK to the CSCF (step G17).

When the CSCF receives the SIP-202 OK, the CSCF transmits the received SIP-202 OK to the FAP (step G18).

In this way, when the IP-SM-GW receives the information concerning the SMS (SMS Status Report) from the SMSC, the IP-SM-GW maps the received information concerning the SMS to a SIP message and transmits the mapped SIP message to the FAP. When the FAP receives the SIP message, the FAP establishes a radio section between the FAP and the UE, converts a SIP message received from the core network side into information conforming to the 3GPP, and transmits the converted information concerning the SMS to the UE. This makes it possible to circulate the information concerning the SMS, which is transmitted from the SMSC, to the UE. Therefore, the SMSC can transmit a delivery report of a short message (SMS Status Report) to the UE (steps G0 to G9). When the FAP receives the information concerning the SMS (SMS Delivery Report) from the UE, the FAP maps the received information concerning the SMS to a SIP message and transmits the mapped SIP message to the IP-SM-GW.

When the IP-SM-GW receives the SIP message and discriminates that the received SIP message is addressed to the SMSC, the IP-SM-GW maps the received SIP message to a MAP message and transmits the mapped MAP message to the SMSC. This makes it possible to circulate the information concerning the SMS, which is transmitted from the UE, to the SMSC. Therefore, the SMSC can receive a delivery result of the short message (SMS Delivery Report) from the UE (steps G11 to G14).

<Processing Operation of the SMS-MT>

Figure 9:
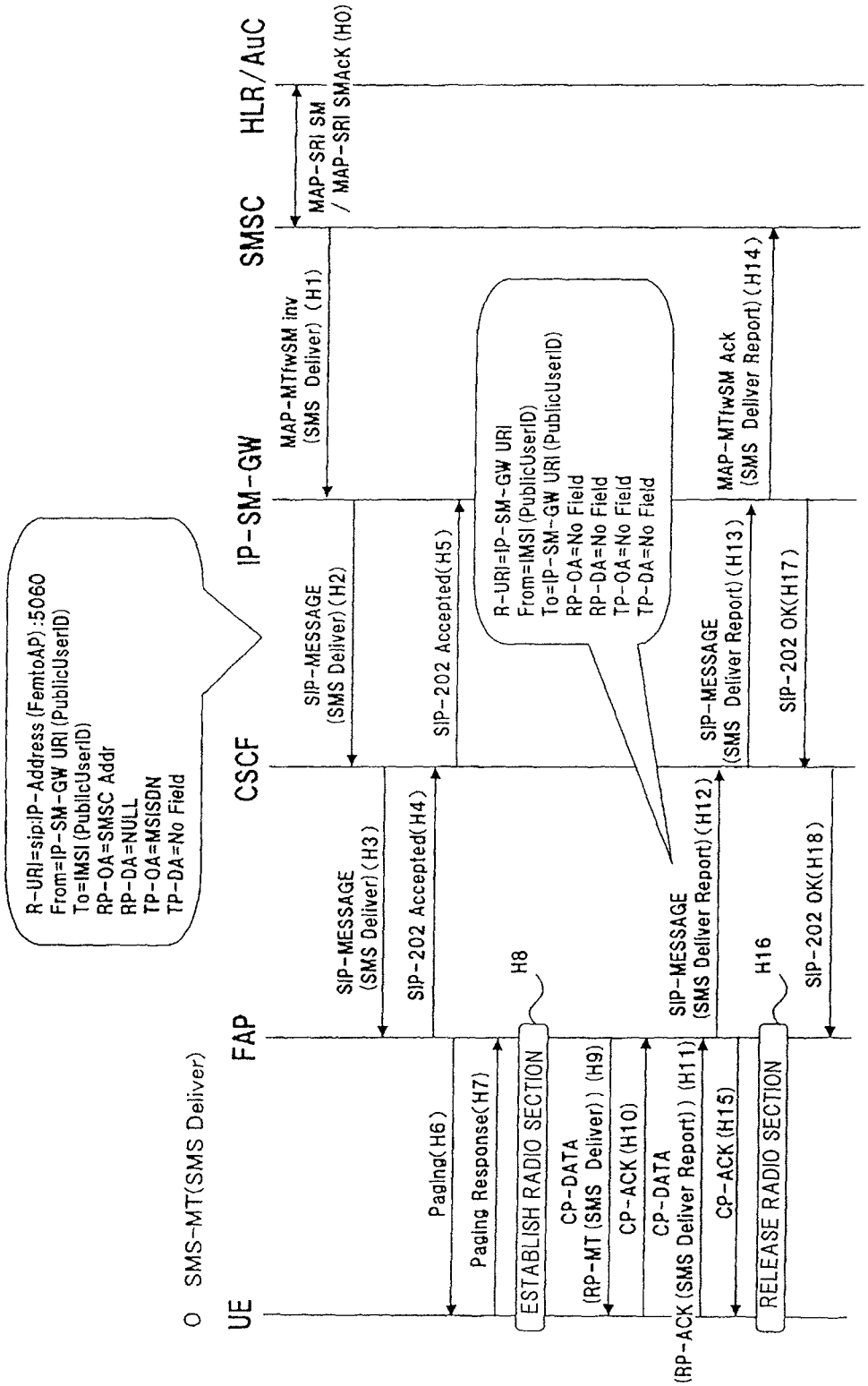
FIG. 9 is a diagram showing an overview of delivery control for a short message performed in the Femto IMS network (a processing operation example of SMS-MT).

Next, a processing operation example of the SMS-MT is explained with reference to FIG. 9. The SMS-MT is a service for performing delivery of a short message from the SMSC to the UE.

The SMSC transmits MAP-Send Routing Information for Short Message (MAP-SRI SM) to the HLR/AuC. The HLR/AuC transmits MAP-Send Routing Information For Short Message Ack (MAP-SRI SMAcK) to the SMSC (step H0).

When the SMSC receives the MAP-SRI SMAcK, the SMSC transmits MAP-Message Type Forward Short Message invocation (SMS Deliver); MAP-MTfwSM inv (SMS Deliver) to the IP-SM-GW (step H1).

When the IP-SM-GW receives the MAP-MTfwSM inv (SMS Deliver), the IP-SM-GW converts the received information (SMS Deliver) into a SIP message and transmits the converted SIP message (SIP-MESSAGE (SMS Deliver)) to the CSCF with the SIP message addressed to the FAP (step H2). The SIP message includes, as shown in FIG. 9, R-URI=sip:IP-Address(FemtoAP):5060, From=IP-SM-GW URI(PublicUserID), To=IMSI(PublicUserID), RP=OA=SMSC Addr, RP-DA=NULL, TP-OA=MSISDN, and TP=DA=No Field.

When the CSCF receives the SIP-MESSAGE (SMS Deliver), the CSCF transmits the SIP-MESSAGE (SMS Deliver) to the FAP (step H3).

When the FAP receives the SIP-MESSAGE (SMS Deliver), the FAP transmits SIP-202 Accepted to the CSCF (step H4).

When the CSCF receives the SIP-202 Accepted, the CSCF transmits the SIP-202 Accepted to the IP-SM-GW (step H5).

When the FAP receives the SIP-MESSAGE (SMS Deliver), the FAP sets a Paging Response waiting timer and transmits Paging to the UE (step H6).

When the UE receives the Paging, the UE transmits a Paging Response to the FAP (step H7) and establishes a radio section between the UE and the FAP (step H8).

When the radio section is established, the FAP converts the information concerning the SMS (SMS Deliver) included in the SIP-MESSAGE into information conforming to the 3GPP and transmits the converted information (CP-DATA (RP-MT (SMS Deliver)) to the UE (step H9).

When the UE receives the CP-DATA (RP-MT(SMS Deliver)), the UE transmits CP-ACK to the FAP (step H10).

As processing operation in steps H11 to H18, processing same as the processing in steps G11 to G18 is performed.

In this way, when the IP-SM-GW receives the information concerning the SMS (SMS Deliver) from the SMSC, the IP-SM-GW maps the received information concerning the SMS to a SIP message and transmits the mapped SIP message to the FAP. When the FAP receives the SIP message, the FAP establishes a radio section between the FAP and the UE, converts a SIP message received from the core network side into information conforming to the 3GPP, and transmits the converted information concerning the SMS to the UE. This makes it possible to circulate the information concerning the SMS, which is transmitted from the SMSC, to the UE. Therefore, the SMSC can transmit a short message (SMS Delivery) to the UE (steps H0 to H9). When the FAP receives the information concerning the SMS (SMS Delivery Report) from the UE, the FAP maps the received information concerning the SMS to a SIP message and transmits, the mapped SIP message to the IP-SM-GW. When the IP-SM-GW receives the SIP message and discriminates that the received SIP message is addressed to the SMSC, the IP-SM-GW maps the received SIP message to a MAP message and transmits the mapped MAP message to the SMSC. This makes it possible to circulate the information concerning the SMS, which is transmitted from the UE, to the SMSC. Therefore, the SMSC can receive a delivery result of the short message (SMS Delivery Report) from the UE (steps H11 to H14).

<SMS-MT Delivery Failure Case 1: UE Out-of-Range (Paging Response Time Out)>

Figure 10:
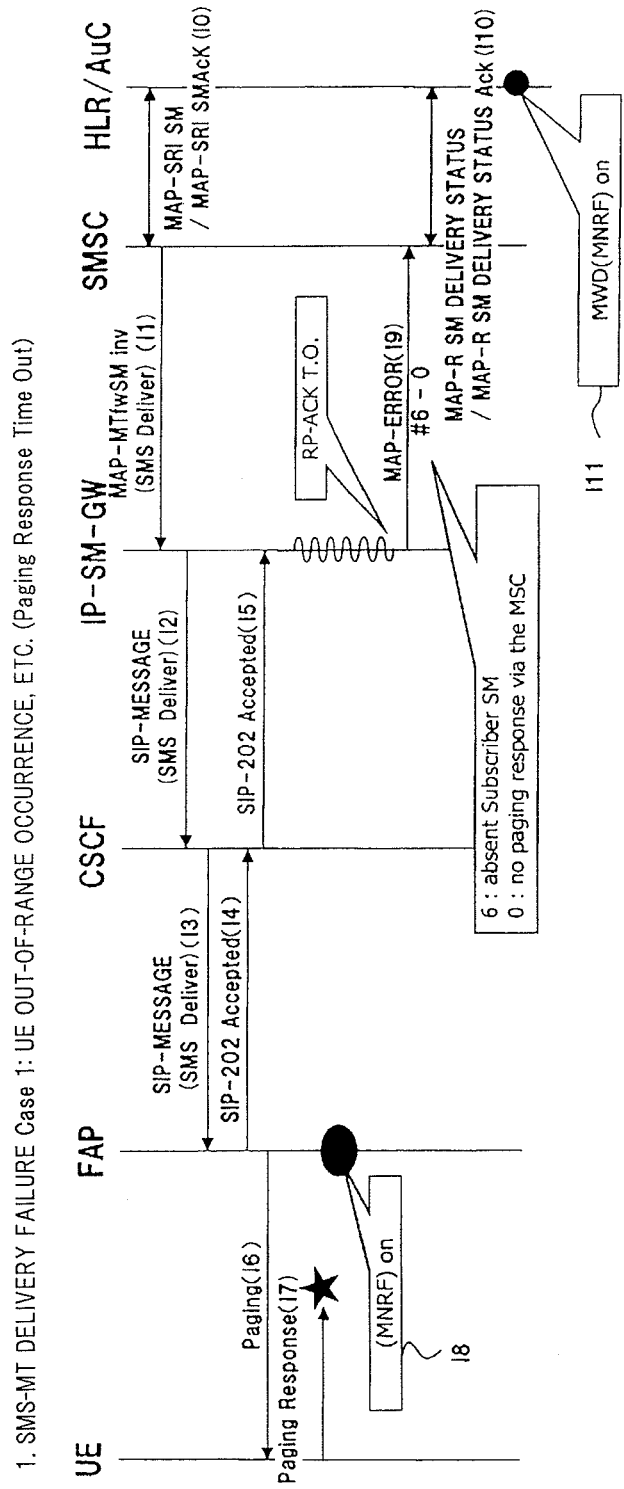
FIG. 10 is a diagram showing an overview of delivery control for a short message performed in the Femto IMS network (a processing operation example at the time of SMS-MT delivery failure (Paging Response Time Out)).

Next, processing operation at the time of SMS-MT delivery failure (Paging Response Time Out) is explained with reference to FIG. 10.

The SMSC transmits MAP-Send Routing Information For Short Message (MAP-SRI SM) to the HLR/AuC. The HLR/AuC transmits MAP-Send Routing Information For Short Message Ack (MAP-SRI SMAcK) to the SMSC (step A0).

When the SMSC receives the MAP-SRI SMAcK, the SMSC transmits MAP-Message Type Forward Short Message invocation (SMS Deliver); MAP-MTfwSM inv (SMS Deliver) to the IP-SM-GW (step I1).

When the IP-SM-GW receives the MAP-MTfwSM inv (SMS Deliver), the IP-SM-GW transmits SIP-MESSAGE (SMS Deliver) to the CSCF (step I2).

When the CSCF receives the SIP-MESSAGE (SMS Deliver), the CSCF transmits the SIP-MESSAGE (SMS Deliver) to the FAP (step I3).

When the FAP receives the SIP-MESSAGE (SMS Deliver), the FAP transmits SIP-202 Accepted to the CSCF (step I4).

When the CSCF receives the SIP-202 Accepted, the CSCF transmits the SIP-202 Accepted to the IP-SM-GW (step I5).

When the FAP receives the SIP-MESSAGE (SMS Deliver), the FAP sets a Paging Response waiting timer and transmits Paging to the UE (step I6).

When the UE receives the Paging, the UE transmits a Paging Response to the FAP (step I7).

When the FAP cannot receive the Paging Response from the UE even when a predetermined time elapses after the FAP transmits the Paging to the UE (Paging Response Time Out), the FAP determines that SMS-MT delivery has failed. In this case, the FAP sets the MNRF (Mobile-Station-Not-Reachable-Flag) to ON (step I8).

When the IP-SM-GW cannot determine the SIP-MESSAGE from the CSCF even when a predetermined time elapses after the IP-SM-GW receives the SIP-202 Accepted (RP-ACK Time Out), the IP-SM-GW determines that the SMS-MT delivery has failed. In this case, the IP-SM-GW transmits MAP-ERROR to the SMSC (step I9). In this case, the IP-SM-GW uses #6(absent Subscriber SM)–0 (no paging response via the MSC) as a MAP ERROR Code. As the MAP ERROR Code, an ERROR Code used in the existing 3G network is directly used. An example of the ERROR Code used in the existing 3G network is shown in FIG. 11. Since the ERROR Code shown in FIG. 11 is publicly known, specific explanation of the ERROR Code is omitted.

When the SMSC receives the MAP-ERROR (#6-0), the SMSC transmits a MAP-REPORT SM DELIVERY STATUS (MAP-R SM DELIVERY STATUS) to the HLR/AuC. The HLR/AuC transmits MAP-REPORT SM DELIVERY STATUS Ack (MAP-R SM DELIVERY STATUS Ack) to the SMSC (step I10). The HLR/AuC sets the MNRF of the MWD (Message-Waiting-Data) to ON (step I11).

<SMS-MT Delivery Failure Case 2: CP-ACK Time Out>

Figure 12:
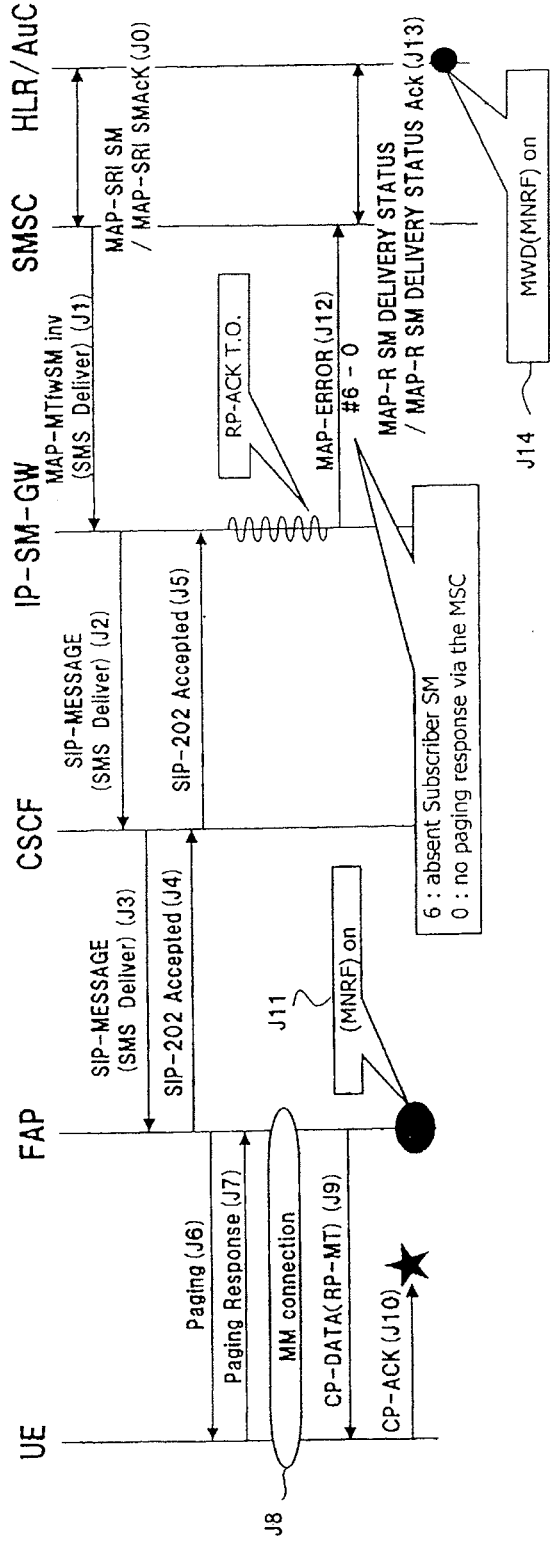
FIG. 12 is a diagram showing an overview of delivery control for a short message performed in the Femto IMS network (a processing operation at the time of SMS-MT delivery failure (CP-ACK Time Out)).

Processing operation at the time of SMS-MT delivery failure (CP-ACK Time Out) is explained with reference to FIG. 12.

After transmitting Paging to the UE (step J6), when the FAP receives a Paging Response from the UE (step J7), the FAP establishes a MM (Mobility Management) connection between the FAP and the UE (step J8).

Next, the FAP sets a CP-ACK waiting timer and transmits CP-DATA (RP-MT) to the UE (step J9).

When the UE receives the CP-DATA (RP-MT), the UE transmits CP-ACK to the FAP (step J10).

When the FAP cannot receive the CP-ACK even when a predetermined time elapses after the FAP transmits the CP-DATA (RP-MT) (CP-ACK Time Out), the FAP determines that SMS-MT delivery has failed. In this case, the FAP sets the MNRF (Mobile-Station-Not-Reachable-Flag) to ON (step J11).

When the IP-SM-GW cannot receive the SIP-MESSAGE from the CSCF even when a predetermined time elapses after the IP-SM-GW receives the SIP-202 Accepted (RP-ACK Time Out), the IP-SM-GW determines that the SMS-MT delivery has failed. In this case, the IP-SM-GW transmits MAP-ERROR (#6-0) to the SMSC (step J12).

When the SMSC receives the MAP-ERROR (#6-0), the SMSC transmits a MAP-REPORT SM DELIVERY STATUS (MAP-R SM DELIVERY STATUS) to the HLR/AuC. The HLR/AuC transmits MAP-REPORT SM DELIVERY STATUS Ack (MAP-R SM DELIVERY STATUS Ack) to the SMSC (step J13). The HLR/AuC sets the MNRF of the MWD (Messages-Waiting-Data) to ON (step J14).

<SMS-MT Delivery Failure Case 3: RP-ACK Time Out>

Figure 13:
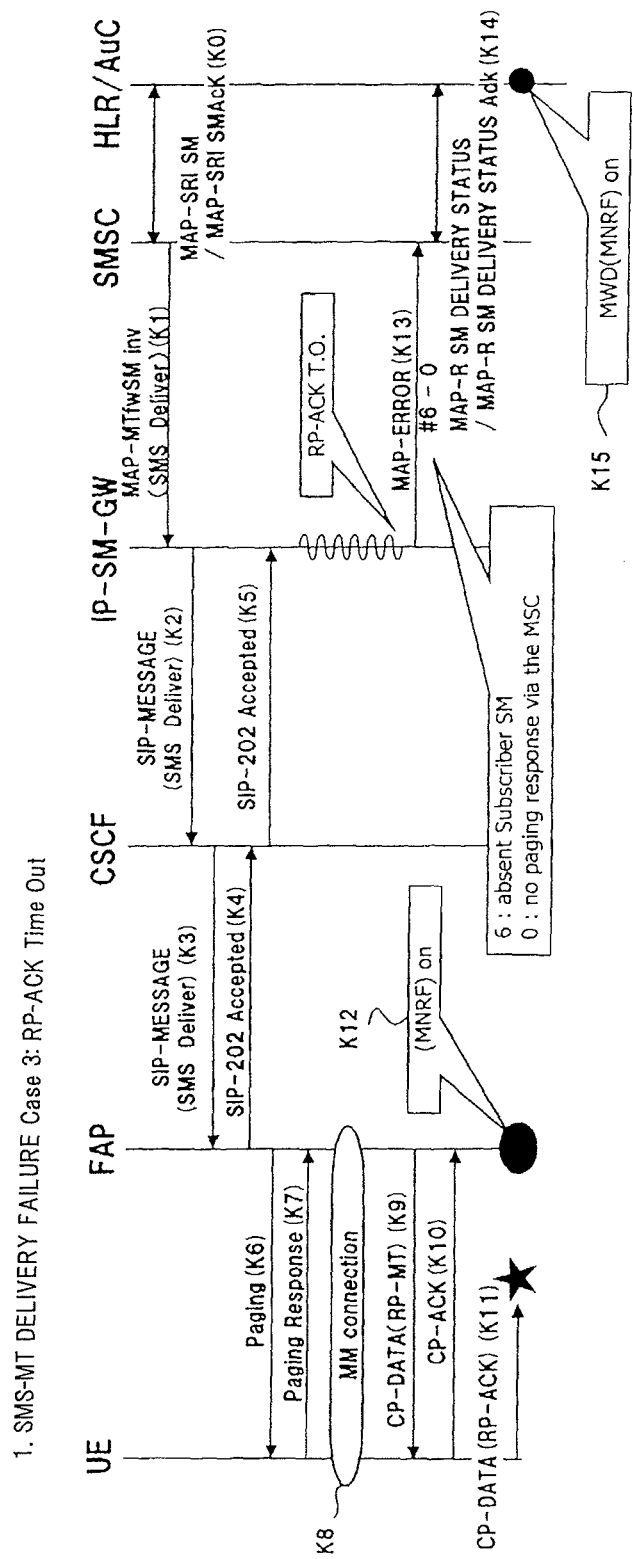
FIG. 13 is a diagram showing an overview of delivery control for a short message performed in the Femto IMS network (a processing operation at the time of SMS-MT delivery failure (RP-ACK Time Out)).

Next, processing operation at the time of SMS-MT delivery failure (RP-ACK Time Out) is explained with reference to FIG. 13.

When the FAP receives the CP-ACK (step K10), the FAP sets a CP-DATA (RP-ACK) waiting timer. When the FAP cannot receive the CP-DATA (RP-ACK) even when a predetermined time elapses after the FAP receives the CP-ACK (RP-ACK Time Out), the FAP determines that the SMS-MT delivery has failed. In this case, the FAP sets the MNRF (Mobile-Station-Not-Reachable-Flag) to ON (step K12).

When the IP-SM-GW cannot receives the SIP-MESSAGE from the CSCF even when a predetermined time elapses after the IP-SM-GW receives the SIP-202 Accepted (RP-ACK Time Out), the IP-SM-GW determines that the SMS-MT delivery has failed. In this case, the IP-SM-GW transmits MAP-ERROR (#6-0) to the SMSC (step K13).

When the SMSC receives the MAP-ERROR (#6-0), the SMSC transmits a MAP-REPORT SM DELIVERY STATUS (MAP-R SM DELIVERY STATUS) to the HLR/AuC. The HLR/AuC transmits MAP-REPORT SM DELIVERY STATUS Ack (MAP-R SM DELIVERY STATUS Ack) to the SMSC (step K14). The HLR/AuC sets the MNRF of the MWD (Message-Waiting-Data) to ON (step K15).

<SMS-MT Delivery Failure Case 4: SIP-202 Accepted Time Out>

Figure 14:
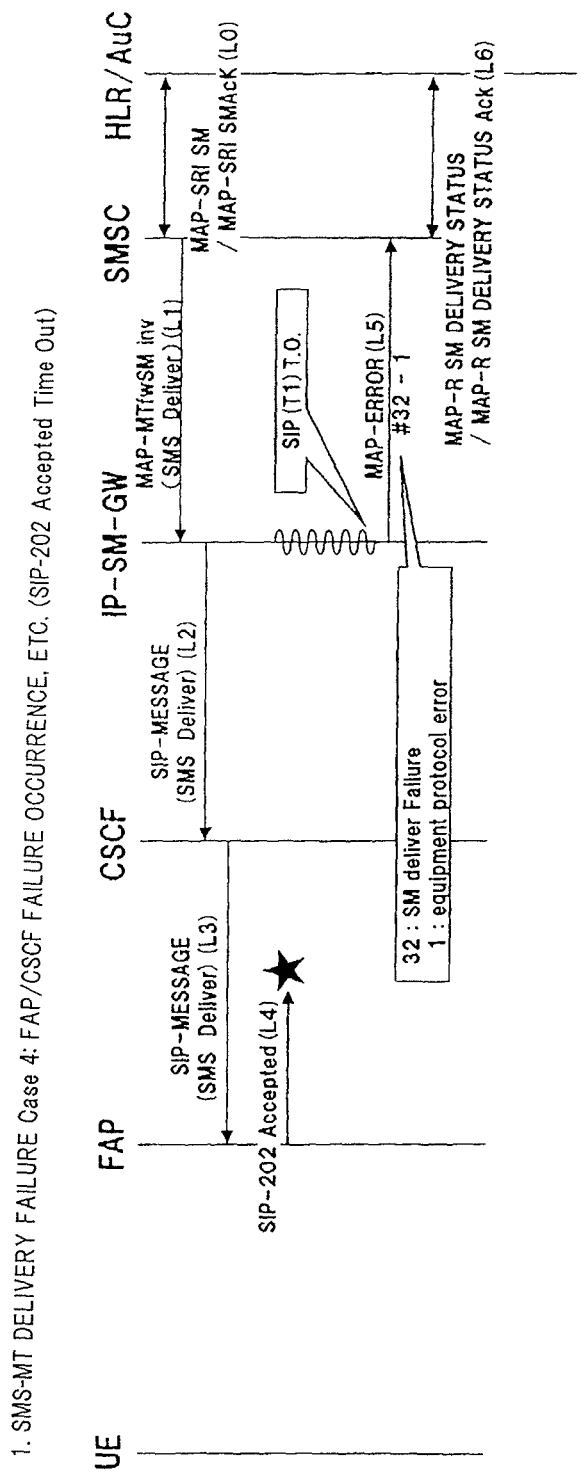
FIG. 14 is a diagram showing an overview of delivery control for a short message performed in the Femto IMS network (a processing operation at the time of SMS-MT delivery failure (SIP-202 Accepted Time Out)).

Next, processing operation at the time of SMS-MT delivery failure (SIP-202 Accepted Time Out) is explained with reference to FIG. 14.

When the IP-SM-GW receives MAP-MTfwSM inv (SMS Deliver), the IP-SM-GW sets a SIP-202 Accepted waiting timer and transmits a SIP-MESSAGE (SMS Deliver) to the CSCF (step L2).

When the IP-SM-GW cannot receive SIP-202 Accepted even when a predetermined time elapses after the IP-SM-GW transmits the SIP-MESSAGE (SMS Deliver) to the CSCF (SIP-202 Accepted Time Out), the IP-SM-GW determines that a failure has occurred in the FAP or the CSCF. In this case, the IP-SM-GW transmits MAP-ERROR to the SMSC (step L5). In this case, the IP-SM-GW uses #32(SM deliver Failure)-1 (equipment Protocol Error) as a MAP Error Code.

When the SMSC receives the MAP-ERROR (#32-1), the SMSC transmits a MAP-REPORT SM DELIVERY STATUS (MAP-R SM DELIVERY STATUS) to the HLR/AuC. The HLR/AuC transmits MAP-REPORT SM DELIVERY STATUS Ack (MAP-R SM DELIVERY STATUS Ack) to the SMSC (step L6). In this case, the HLR/AuC does not set the MNRF of the MWD (Messages-Waiting-Data) to ON.

<SMS-MT Delivery Failure Case 5: no VLR>

Figure 15:
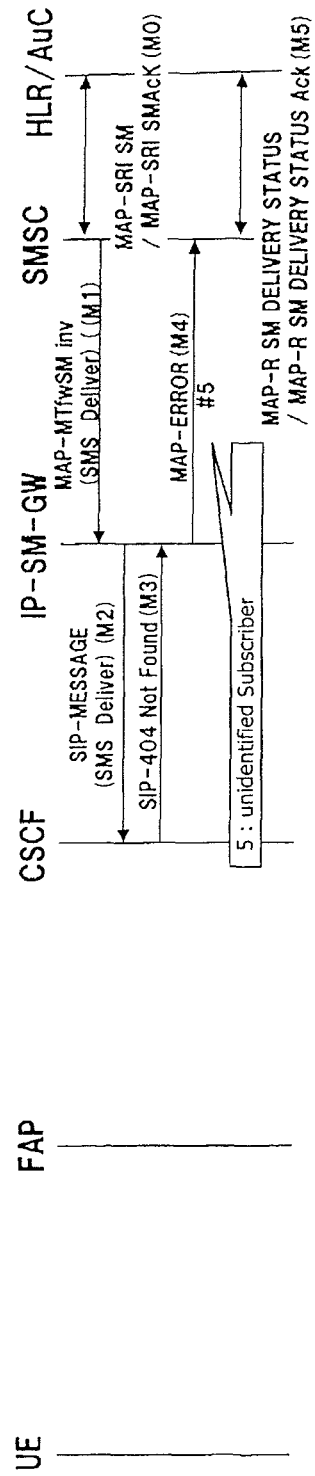
FIG. 15 is a diagram showing an overview of delivery control for a short message performed in the Femto IMS network (a processing operation at the time of SMS-MT delivery failure (no VLR)).

Next, processing operation at the time of SMS-MT delivery failure (no VLR) is explained with reference to FIG. 15.

The IP-SM-GW transmits a SIP-MESSAGE (deliver) to the CSCF (step M2). The CSCF receives the SIP-MESSAGE (deliver).

When the CSCF receives a SIP-MESSAGE (SMS Deliver), if the CSCF cannot transmit the SIP-MESSAGE (SMS Deliver) to the FAP, the CSCF transmits SIP-404 Not Found to the IP-SM-GW (step M3).

When the IP-SM-GW receives the SIP-404 Not Found from the CSCF, the IP-SM-GW transmits MAP-ERROR to the SMSC (step M4). In this case, the IP-SM-GW uses #5(unidentified Subscriber) as a MAP ERROR Code.

When the SMSC receives the MAP-ERROR (#5), the SMSC transmits a MAP-REPORT SM DELIVERY STATUS (MAP-R SM DELIVERY STATUS) to the HLR/AuC. The HLR/AuC transmits MAP-REPORT SM DELIVERY STATUS Ack (MAP-R SM DELIVERY STATUS Ack) to the SMSC (Step M5). In this case, the HLR/AuC does not set the MNRF of the MWD (Messages-Waiting-Data) to ON.

<Processing Operation Performed When the FAP Detects Return from out-of-range of the UE After SMS-MT Delivery Failure (For Example, the UE Being out-of-range)>

Figure 16:
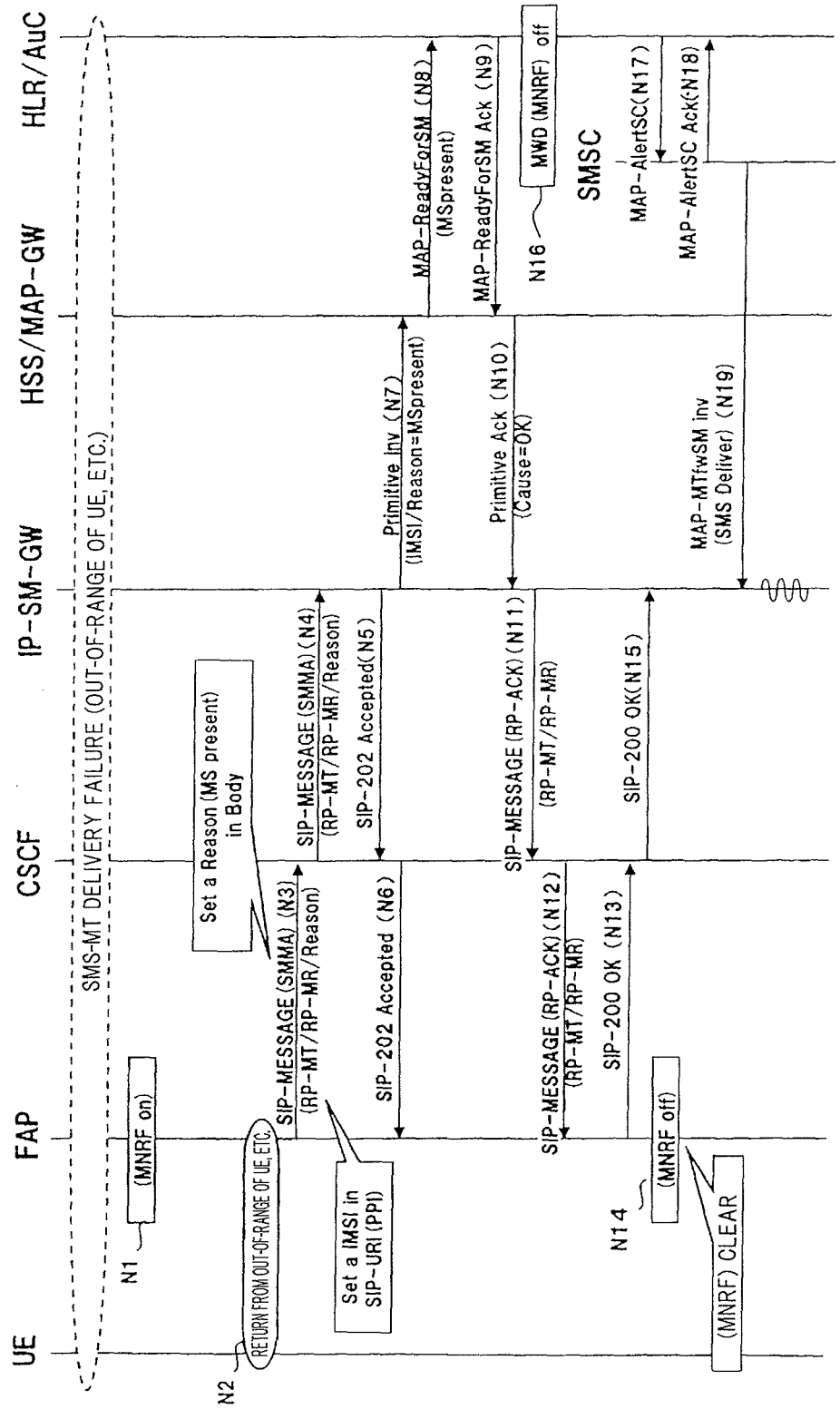
FIG. 16 is a diagram showing an overview of delivery control for a short message performed in the Femto IMS network (a processing operation example performed when a FAP detects return from out-of-range of UE after SMS-MT delivery failure).

Next, processing operation performed when the FAP detects return from out-of-range of the UE after SMS-MT delivery failure is explained with reference to FIG. 16.

After setting the MNRF to ON (step N1), when the FAP detects, for example, return from out-of-range of the UE (step N2), the FAP transmits a SIP-MESSAGE (SMMA) (RP-MT/RP-MR/Reason) to the CSCF (step N3).

Figure 17:
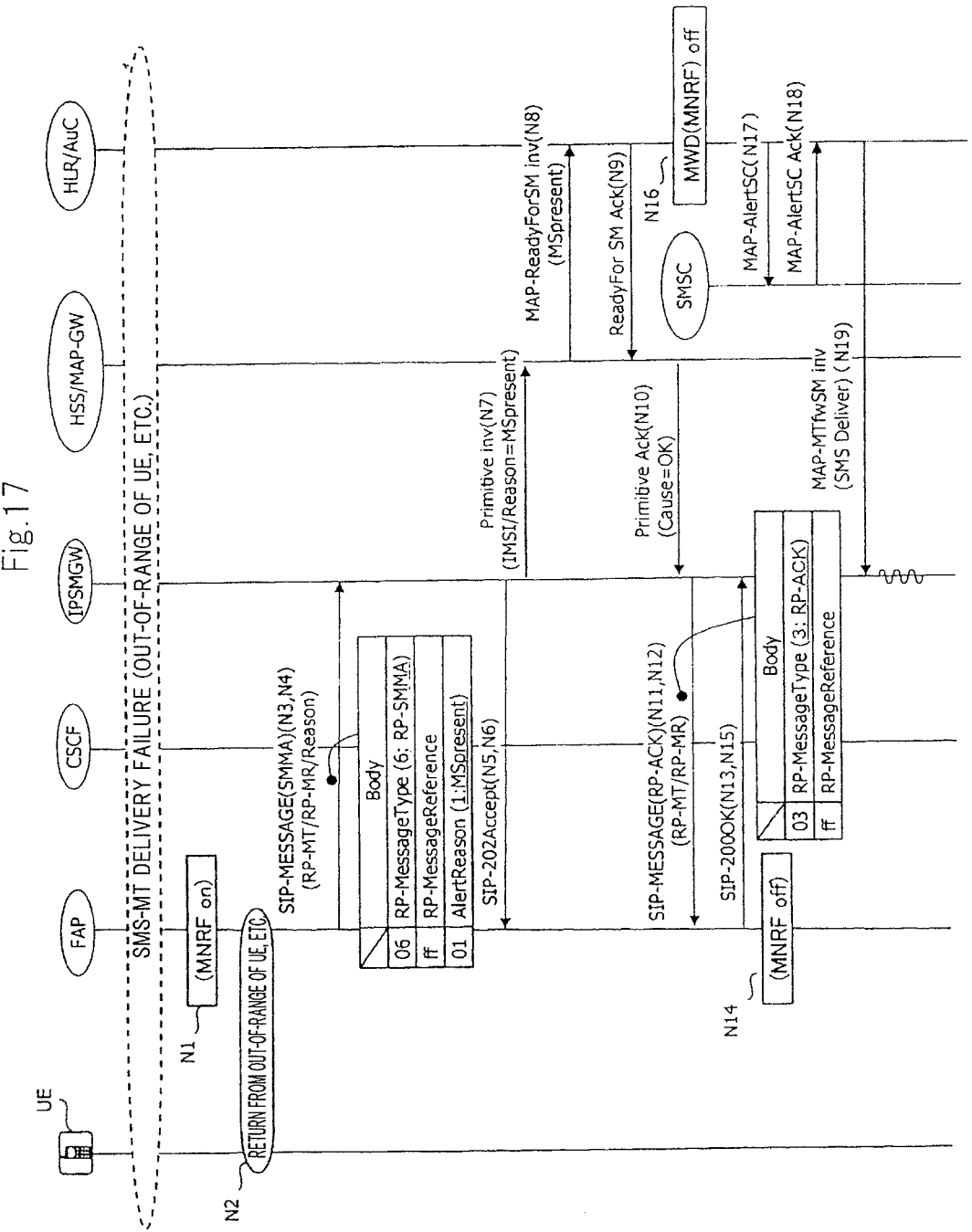
FIG. 17 is a diagram showing an overview of delivery control for a short message performed in the Femto IMS network (a processing operation example performed when a FAP detects return from out-of-range of UE after SMS-MT delivery failure).

In this case, the FAP gives IMSI to a PPI (P-Preferred-Identity) of SIP-URI. The FAP gives a Reason (MS Present) to a Body unit of the SIP. A structure example of the Body unit of the SIP is shown in FIG. 17. In FIG. 17, RP-MessageType (6:RP-SMMA), RP-MessageReference, and AlterReason (1:MSpresent) are given to the Body unit of the SIP.

When the CSCF receives the SIP-MESSAGE (SMMA) (RP-MT/RP-MR/Reason), the CSCF transmits the received SIP-MESSAGE (SMMA) (RP-MT/RP-MR/Reason) to the IP-SM-GW (step N4).

When the IP-SM-GW receives the SIP-MESSAGE (SMMA) (RP-MT/RP-MR/Reason), the IP-SM-GW transmits SIP-202 Accepted to the CSCF (step N5).

When the CSCF receives the SIP-202 Accepted, the CSCF transmits the SIP-202 Accepted to the FAP (step N6).

When the IP-SM-GW receives the SIP-MESSAGE (SMMA) (RP-MT/RP-MR/Reason), since the Protocol Discriminator is the SMS and the RP-message Type is the SMMA, the IP-SM-GW maps the SIP-MESSAGE (SMMA) (RP-MT/RP-MR/Reason) to a SCTP message and transmits the mapped SCTP message (Primitive invocation (IMSI/Reason=MSpresent) to the HSS/MAP-GW (step N7).

When the HSS/MAP-GW receives the Primitive invocation (IMSI/Reason=MSpresent), the HSS/MAP-GW maps the received information to a MAP message using a MAP-GW function and transmits the mapped MAP message (MAP-ReadyForSM (MSpresent)) to the HLR/AuC (step N8).

When the HLR/AuC receives the MAP-ReadyForSM (MSpresent), the HLR/AuC transmits MAP-ReadyForSM Ack to the HSS/MAP-GW (step N9).

When the HSS/MAP-GW receives the MAP-ReadyForSM Ack, the HSS/MAP-GW maps the received information to a SCTP message using the MAP-GW function and transmits the mapped SCTP message (Primitive Ack (Cause=OK)) to the IP-SM-GW (step N10).

When the IP-SM-GW receives the Primitive Ack (Cause=OK), the IP-SM-GW converts the received information (Primitive Ack (Cause=OK)) into a SIP message and transmits the converted SIP message (SIP-MESSAGE (RP-ACK) (RP-MT/RP-MR)) to the CSCF with the SIP message addressed to the FAP (step N11).

In this case, as shown in FIG. 17, the IP-SM-GW gives RP-Message Type (3:RP-ACK), RP-MessageReference to the Body unit of the SIP and transmits the given SIP-MESSAGE (RP-ACK) (RP-MT/RP-MR) to the CSCF.

When the CSCF receives the SIP-MESSAGE (RP-ACK) (RP-MT/RP-MR), the CSCF transmits the received SIP-MESSAGE (RP-ACK) (RP-MT/RP-MR) to the FAP (step N12).

When the FAP receives the SIP-MESSAGE (RP-ACK) (RP-MT/RP-MR), the FAP transmits SIP-200 OK to the CSCF (step N13). The FAP sets the MNRF to OFF (step N14).

When the CSCF receives the SIP-200 OK, the CSCF transmits the SIP-200 OK to the IP-SM-GW (step N15).

When the HLR/AuC receives the MAP-ReadyForSM (MSpresent), the HLR/AuC sets the MNRF to OFF (step N16) and transmits MAP-Alert SC to the SMSC (step N17).

When the SMSC receives the MAP-Alert SC, the SMSC transmits the MAP-Alert SC Ack to the HLR/AuC (step N18). The SMSC transmits MAP-MTfwSM inv (SMS Deliver) to the IP-SM-GW (step N19) and starts retransmission of a short message.

<Ready For SM (MS Present) Failure Case (Error Response)>

Figure 18:
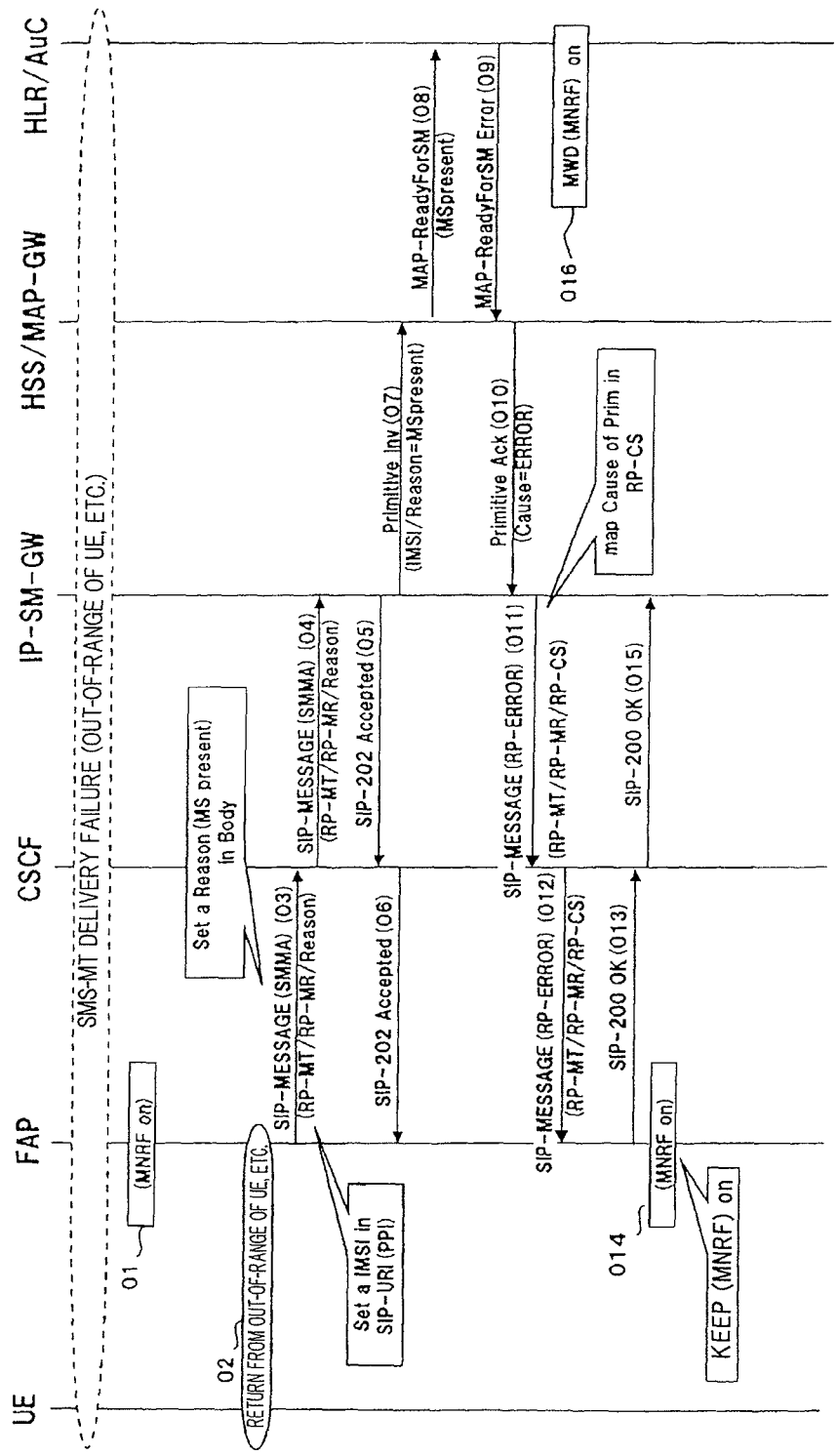
FIG. 18 is a diagram showing an overview of delivery control for a short message performed in the Femto IMS network (Ready For SM (MS present) failure case (error response)).

Next, processing operation in the case of a Ready For SM (MS present) failure case (error response) is explained with reference to FIG. 18.

When Ready For SM (MSpresent) fails, the HLR/AuC transmits MAP-ReadyForSM Error to the HSS/MAP-GW (step O9).

When the HSS/MAP-GW receives the MAP-ReadyForSM Error, the HSS/MAP-GW maps the received information to a SCTP message using the MAP-GW function, the HSS/MAP-GW transmits the mapped SCTP message (Primitive Ack (Cause=ERROR)) to the IP-SM-GW (step O10).

When the IP-SM-GW receives the Primitive Ack (Cause=ERROR), the IP-SM-GW converts the received information (Primitive Ack (Cause=ERROR) into a SIP message and transmits the converted SIP message (SIP-MESSAGE (RP-ERROR) (RP-MT/RP-MR/RP-CS) to the CSCF with the SIP message addressed to the FAP (step O11). Since content of Cause included in the Primitive Ack is ERROR, the IP-SM-GW maps the content of the Cause to RP-CS and transmits SIP-MESSAGE including the RP-CS to the CSCF.

When the CSCF receives the SIP-MESSAGE (RP-ERROR) (RP-MT/RP-MR/RP-CS), the CSCF transmits the received SIP-MESSAGE (RP-ERROR) (RP-MT/RP-MR/RP-CS) to the FAP (step O12).

When the FAP receives the SIP-MESSAGE (RP-ERROR) (RP-MT/RP-MR/RP-CS), the FAP transmits SIP-200 OK to the CSCF (step O13). Since the SIP-MESSAGE includes RP-ERROR information, the FAP keeps a state in which the MNRF is set to ON (step O14).

When the CSCF receives the SIP-200 OK, the CSCF transmits the SIP-200 OK to the IP-SM-GW (step O15).

When the Ready For SM (MSpresent) fails, the HLR/AuC keeps a state in which the MNRF is set to ON (step O16).

<Ready For SM (MS Present) Failure Case (CN Side No Response or the Like>

Figure 19:
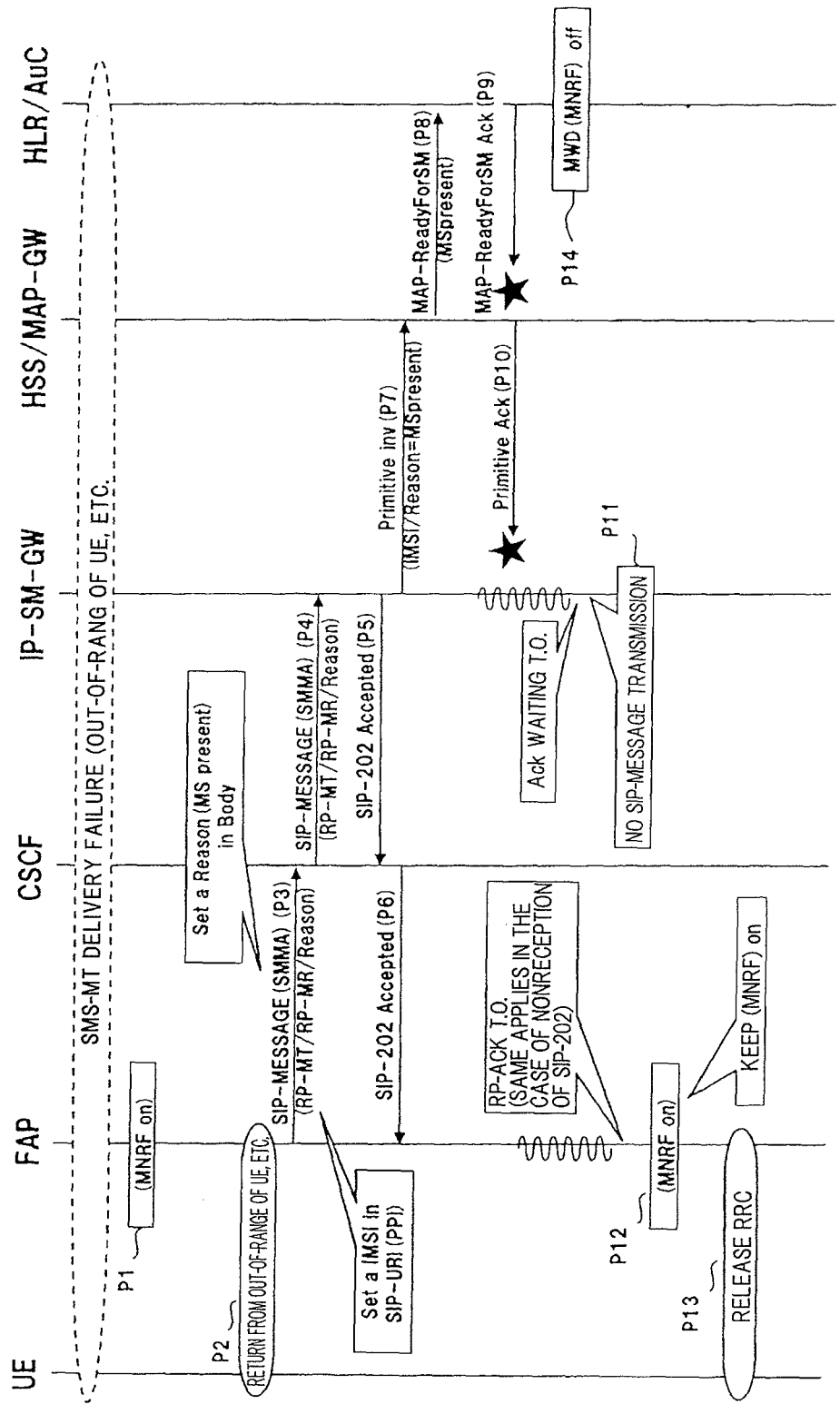
FIG. 19 is a diagram showing an overview of delivery control for a short message performed in the Femto IMS network (Ready For SM (MS present) failure case (CN side no response, etc.)).

Next, processing operation in the case of Ready For SM (MS present) failure case (CN side no response or the like) is explained with reference to FIG. 19.

When the IP-SM-GW cannot receive Primitive Ack from the HSS/MAP-GW even when a predetermined time elapses after the IP-SM-GW transmits Primitive invocation (IMSI/Reason=MSpresent) to the HSS/MAP-GW (Ack waiting Time Out), the IP-SM-GW does not transmit SIP-MESSAGE to the CSCF (step P11). As causes of the Ack waiting Time Out, for example, the IP-SM-GW cannot receive the Primitive Ack or the HSS/MAP-GW cannot receive MAP-ReadyForSM Ack.

In this case, since the FAP cannot receive SIP-MESSAGE from the CSCF even when a predetermined time elapses after the FAP receives SIP-200 Accepted (RP-ACK Time Out), the FAP keeps a state in which the MNRF is set to ON (step P12). The FAP performs release processing for RRC (Radio Resource Control) (step P13).

When the FAP cannot receive the SIP-202 Accepted even when a predetermined time elapses after the FAP transmits SIP-MESSAGE (SMMA) (RP-MT/RP-MR), the FAP also keeps the state in which the MNRF is set to ON (step P12).

<Memory Full at the Time of SMS-MT Delivery Failure>

Figure 20:
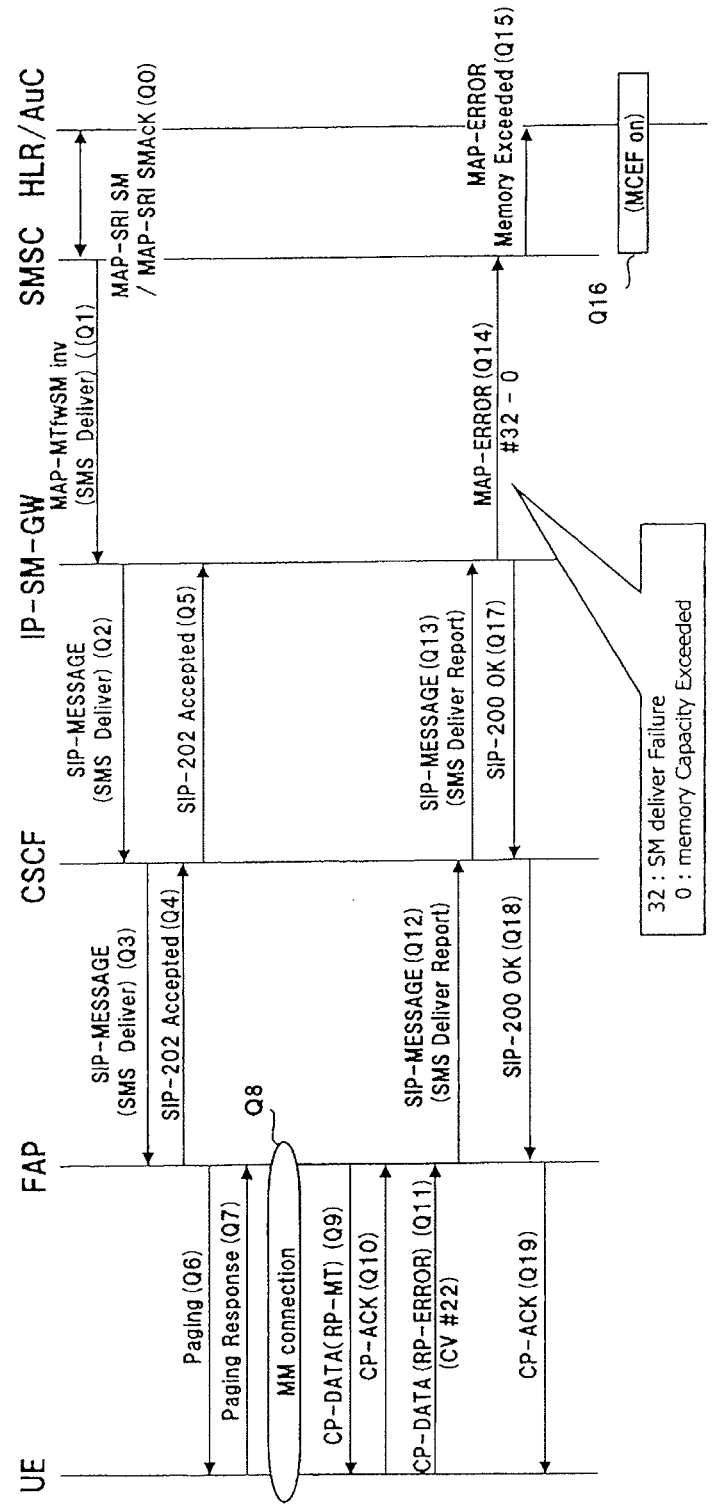
FIG. 20 is a diagram showing an overview of delivery control for a short message performed in the Femto IMS network (Memory Full at the time of SMS-MT delivery failure)

Next, processing operation in the case of Memory Full at the time of SMS-MT delivery failure is explained with reference to FIG. 20.

When memory insufficiency occurs, the UE transmits CP-DATA (RP-ERROR) (CV #22) to the FAP (step Q11).

When the FAP receives the CP-DATA (RP-ERROR) (CV #22), the FAP converts the received information (CP-DATA (RP-ERROR) (CV #22)) into a SIP message and transmits the converted SIP message (SIP-MESSAGE (SMS Deliver Report)) to the CSCF with the SIP message addressed to the IP-SM-GW (step Q12).

When the CSCF receives the SIP-MESSAGE (SMS Deliver Report), the CSCF transmits the received SIP-MESSAGE (SMS Deliver Report) to the IP-SM-GW (step Q13).

When the IP-SM-GW receives the SIP-MESSAGE (SMS Deliver Report), since the Protocol Discriminator is the SMS and the RP-Message Type is other than the SMMA, the IP-SM-GW maps the SIP-MESSAGE (SMS Deliver Report) to a MAP message and transmits the mapped MAP message (MAP-ERROR (#32-0)) to the SMSC (step Q14).

When the SMSC receives the MAP-ERROR (#32-0), the SMSC transmits MAP-ERROR Memory Exceeded to the HLR/AuC (step Q15).

When the HLR/AuC receives the MAP-ERROR Memory Exceeded, the HLR/AuC sets the MCEF to ON (step Q16).

When the IP-SM-GW receives the SIP-MESSAGE (SMS Deliver Report), the IP-SM-GW transmits SIP-200 OK to the CSCF (step Q17).

When the CSCF receives the SIP-200 OK, the CSCF transmits the SIP-200 OK to the FAP (step Q18).

When the FAP receives the SIP-200 OK, the FAP transmits CP-ACK to the UE (step Q19).

<Processing Operation Performed when the FAP Receives RP-SMMA After SMS-MT Delivery Failure (Memory Capacity Exceeded)>

Figure 21:
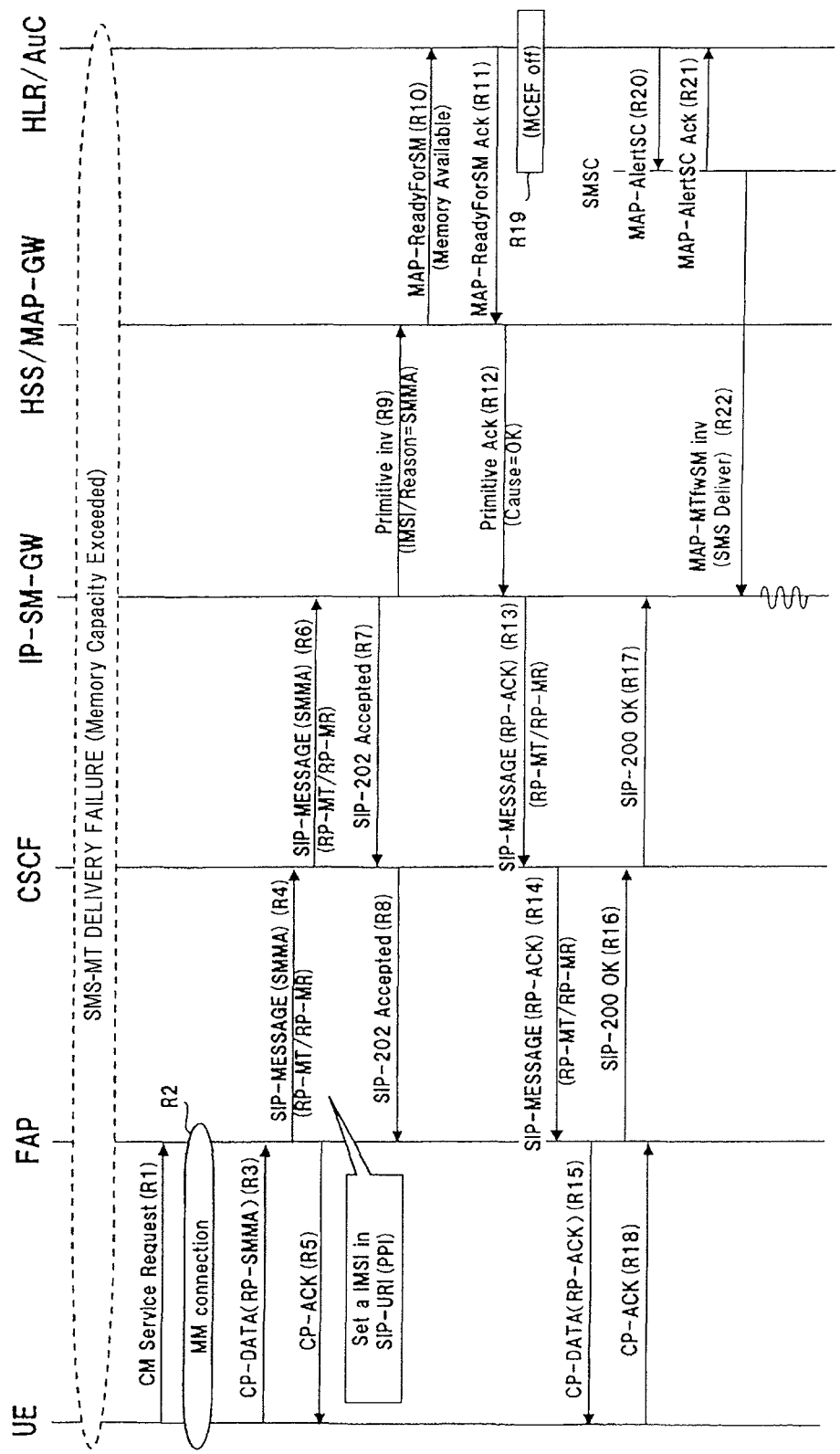
FIG. 21 is a diagram showing an overview of delivery control for a short message performed in the Femto IMS network (after SMS-MT delivery failure (Memory Capacity Exceeded)).

Next, processing operation performed when the FAP receives RP-SMMA after SMS-MT delivery failure (Memory Capacity Exceeded) is explained with reference to FIG. 21.

The UE transmits CM Service Request to the FAP (step R1) and performs MM connection processing between the UE and the FAP (step R2). When memory insufficiency is eliminated, the UE transmits CP DATA (RP-SM MEMORY AVAILABLE) to the FAP (step R3).

Figure 22:
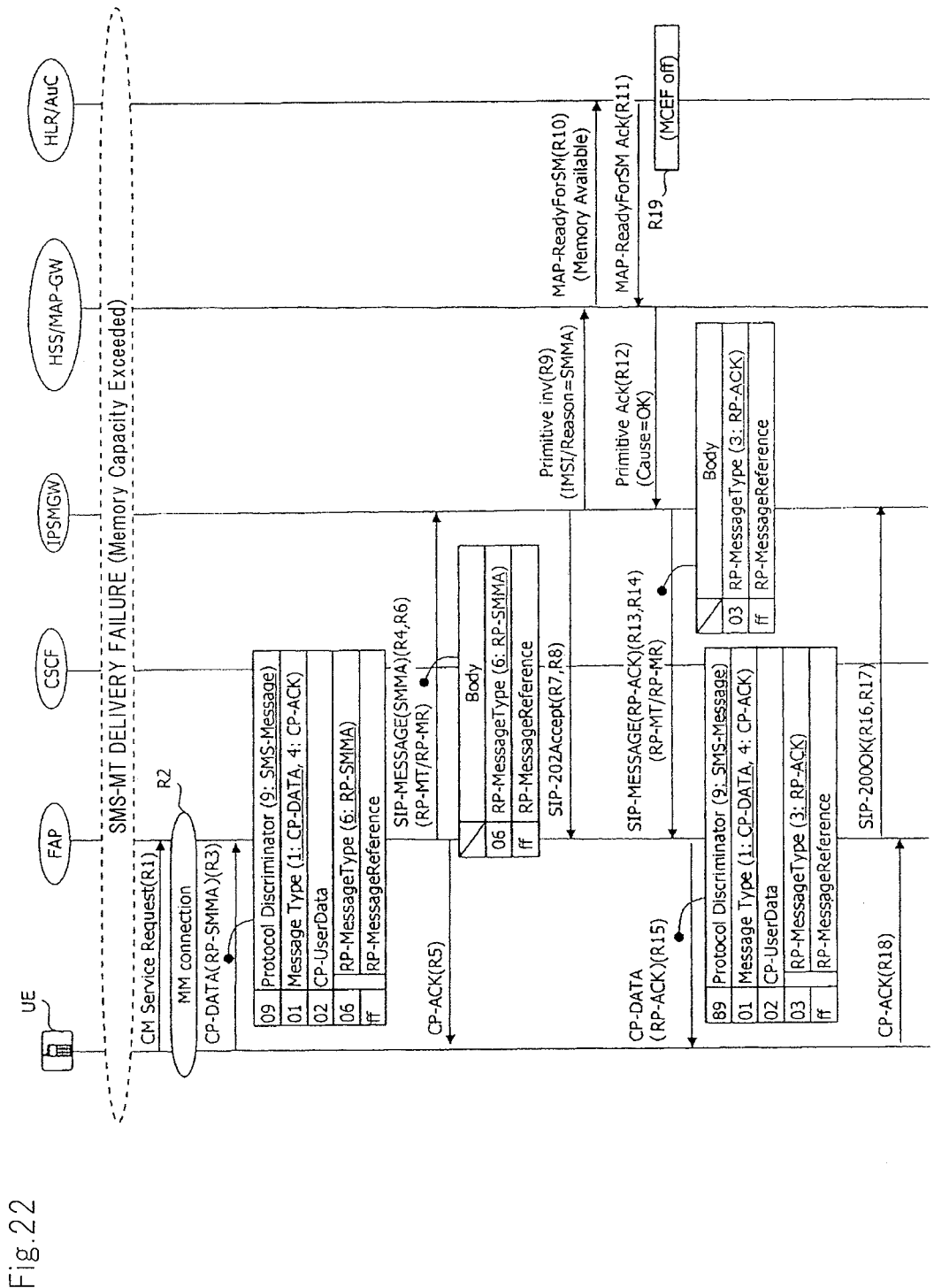
FIG. 22 is a diagram showing an overview of delivery control for a short message performed in the Femto IMS network (after SMS-MT delivery failure (Memory Capacity Exceeded)).

The CP DATA (RP-SM MEMORY AVAILABLE) includes, as shown in FIG. 22, Protocol Discriminator (9: SMS-Message), Message Type (1: CP-DATA, 4: CP-ACK), CP-UserData, RP-MessageType (6: RP-SMMA), and RP-MessageReference.

When the FAP receives the CP DATA (RP-SMMA), the FAP converts the received information (CP DATA (RP-SMMA)) into a SIP message and transmits the converted SIP message (SIP-MESSAGE (SMMA) (RP-MT/RP-MR) to the CSCF with the SIP message addressed to the IP-SM-GW (step R4). The FAP transmits CP-ACK to the UE (step R5).

The Body unit of the SIP includes, as shown in FIG. 22, RP-MessageType (6: RP-SMMA) and RP-MessageReference.

When the CSCF receives the SIP-MESSAGE (SMMA) (RP-MT/RP-MR), the CSCF transmits the received SIP-MESSAGE (SMMA) (RP-MT/RP-MR) to the IP-SM-GW (step R6).

When the IP-SM-GW receives the SIP-MESSAGE (SMMA) (RP-MT/RP-MR), the IP-SM-GW transmits SIP-200 Accepted to the CSCF (step R7).

When the CSCF receives the SIP-200 Accepted, the CSCF transmits the SIP-200 Accepted to the FAP (step R8).

When the IP-SM-GW receives the SIP-MESSAGE (SMMA) (RP-MT/RP-MR), since the Protocol Discriminator is the SMS and the RP-Message Type is the SMMA, the IP-SM-GW maps the SIP-MESSAGE (SMMA) (RP-MT/RP-MR) to a SCTP message and transmits the mapped SCTP message (Primitive invocation (IMSI/Reason=SMMA) to the HSS/MAP-GW (step R9).

When the HSS/MAP-GW receives the Primitive invocation (IMSI/Reason=SMMA), the HSS/MAP-GW maps the received information to a MAP message using the MAP-GW function and transmits the mapped MAP message (MAP-ReadyForSM (Memory Available) to the HLR/AuC (step R10).

When the HLR/AuC receives the MAP-ReadyForSM (Memory Available), the HLR/AuC transmits MAP-ReadyForSM AcK to the HSS/MAP-GW (step R11).

When the HSS/MAP-GW receives the MAP-ReadyForSM AcK, the HSS/MAP-GW maps the received information to a SCTP message using the MAP-GW function and transmits the mapped SCTP message (Primitive Ack (Cause=OK) to the IP-SM-GW (step R12).

When the IP-SM-GW receives the Primitive Ack (Cause=OK), the IP-SM-GW converts the received information (Primitive Ack (Cause=OK)) into a SIP message and transmits the converted SIP message (SIP-MESSAGE (RP-ACK) (RP-MT/RP-MR) to the CSCF with the SIP message addressed to the FAP (step R13).

A body unit of the SIP-MESSAGE includes, as shown in FIG. 22, RP-MessageType (3: RP-ACK) and RP-MessageReference.

When the CSCF receives the SIP-MESSAGE (RP-ACK) (RP-MT/RP-MR), the CSCF transmits the received SIP-MESSAGE (RP-ACK) (RP-MT/RP-MR) to the FAP (step R14).

When the FAP receives the SIP-MESSAGE (RP-ACK) (RP-MT/RP-MR), the FAP converts the received SIP-MESSAGE (RP-ACK) (RP-MT/RP-MR) into information conforming to the 3GPP and transmits the converted information (CP-DATA (RP-ACK)) to the UE (step R15). The FAP transmits SIP-200 OK to the CSCF (step R16).

The CP-DATA (RP-ACK) includes, as shown in FIG. 22, Protocol Discriminator (9: SMS-Message), Message Type (1: CP-DATA, 4: CP-ACK), CP-UserData, RP-MessageType (3: RP-ACK), and RP-MessageReference.

When the CSCF receives the SIP-200 OK, the CSCF transmits the SIP-200 OK to the IP-SM-GW (step R17).

When the UE receives the CP-DATA (RP-ACK), the UE transmits CP-ACK to the FAP (step R18).

When the HLR/AuC receives the MAP-ReadyForSM (Memory Available), the HLR/AuC sets the MCEF to OFF (step R19) and transmits MAP-AlertSC to the SMSC (step R20).

When the SMSC receives the MAP-AlertSC, the SMSC transmits MAP-AlertSC Ack to the HLR/AuC (step R21).

The SMSC transmits MAP-MTfwSM inv (SMS Deliver) to the IP-SM-GW (step R22) and starts retransmission of a short message.

21 Ready For SM (SMMA) Failure Case (Error Response)>

Next, processing operation performed when Ready For SM (SMMA) failure case (error response) is explained with reference to FIG. 23.

When the FAP receives SIP-MESSAGE (RP-ERROR) (RP-MT/RP-MR/RP-CS) (step S14), the FAP converts the received SIP-MESSAGE (RP-ERROR) (RP-MT/RP-MR/RP-CS) into information conforming to the 3GPP and transmits the converted information (CP-DATA (RP-ERROR)) to the UE (step S15). The FAP transmits SIP-200 OK to the CSCF (step S16).

When the UE receives the CP-DATA (RP-ERROR), the UE transmits CP-ACK to the FAP (step S18).

When Ready For SM (MSpresent) fails, the HLR/AuC keeps a state in which the MCEF is set to ON (step S19).

<Ready For SM (SMMA) Failure Case (CN Side no Response or the Like)>

Next, processing operation in the case of Ready For SM (SMMA) failure case (CN side no response or the like) is explained with reference to FIG. 24.

When the IP-SM-GW cannot receive Primitive Ack from the HSS/MAP-GW even when a predetermined time elapses after the IP-SM-GW transmits Primitive invocation (IMSI/Reason=MSpresent) to the HSS/MAP-GW (Ack waiting Time Out), the IP-SM-GW does not transmit SIP-MESSAGE to the CSCF (step T13).

In this case, since the FAP cannot receive SIP-MESSAGE from the CSCF even when a predetermined time elapses after the FAP receives SIP-200 Accepted (RP-ACK Time Out), the FAP performs release processing for the RRC (step T14).

Similarly, when the FAP cannot receive the SIP-202 Accepted even when a predetermined time elapses after the FAP transmits SIP-MESSAGE (SMMA) (RP-MT/RP-MR), the FAP performs the release processing for the RRC (step T14).

<Operations and Effects of the Communication System According to the Exemplary Embodiment>

As explained above, the communication system according to the exemplary embodiment performs, as communication between the UE and the FAP, communication conforming to the 3GPP performed between the UE and the MSC. When the FAP receives information concerning the SMS (information conforming to the 3GPP), the FAP maps the received information concerning the SMS to a SIP message and transmits the mapped SIP message to the IP-SM-GW. When the IP-SM-GW receives the SIP message, if the Protocol Discriminator is the SMS and the RP-Message Type is other than the SMMA, the IP-SM-GW sets the SMSC as a transmission destination and maps the received SIP message to a MAP message. The IP-SM-GW transmits the mapped MAP message to the SMSC and circulates the information concerning the SMS, which is transmitted from the UE, to the SMSC. When the IP-SM-GW receives the information concerning the SMS from the SMSC, the IP-SM-GW maps the received information concerning the SMS to the SIP message and transmits the mapped SIP message to the FAP. When the FAP receives the SIP message, the FAP converts the received SIP message into information conforming to the 3GPP, transmits the converted information concerning the SMS to the UE, and circulates the information concerning the SMS, which is transmitted from the SMSC, to the UE.

When the IP-SM-GW receives the SIP message, if the Protocol Discriminator is the SMS and the RP-Message Type is the SMMA, the IP-SM-GW sets the HSS/MAP-GW as a transmission destination and maps the received SIP message to a SCTP message. The IP-SM-GW transmits the mapped SCTP message to the HSS/MAP-GW and circulates the information concerning the SMS, which is transmitted from the UE, to the HLR/AuC via the HSS/MAP-GW. When the IP-SM-GW receives the information concerning the SMS, which is transmitted from the HLR/AuC, from the HSS/MAP-GW, the IP-SM-GW maps the received information concerning the SMS to the SIP message and transmits the mapped SIP message to the FAP. When the FAP receives the SIP message, the FAP converts the received SIP message to information conforming to the 3GPP, transmits the converted information concerning the SMS to the UE, and circulates the information concerning the SMS, which is transmitted from the HLR/AuC, to the UE.

The MNRF (Mobile-Station-Not-Reachable-Flag) is provided in the FAP that can easily grasp an out-of-range state of the UE. When the FAP detects the UE being out-of-range during delivery of a short message, the FAP sets the MNRF to ON and shifts the MNRF to a state indicating that the SMS (Short Message Service) is unreachable. When the UE returns from out-of-range, the FAP notifies the HLR/AuC of MS Present information via the PDG, the CSCF, the IP-SM-GW, and the HSS/MAP-GW. When the FAP receives ACK (RP-ACK) to the MS Present information via the HLR/AuC, the HSS/MAP-GW, the IP-SM-GW, the CSCF, and the PDG, the FAP sets the MNRF to OFF and shifts the MNRF to a state in which the SMS is reachable. When the HLR/AuC receives the MS Present information, the HLR/AuC notifies the SMSC of a retransmission request for a short message. When the SMSC receives the retransmission request for a short message from the HLR/AuC, the SMSC starts retransmission of a short message and delivers the short message to the UE via the IP-SM-GW, the CSCF, the PDG, and the FAP.

When the FAP receives, from the UE, information indicating that the insufficient memory in the UE occurs, the FAP notifies the HLR/AuC of the information to that effect via the PDG, the CSCF, the IP-SM-GW, and the SMSC. When the HLR/AuC receives the information indicating that the insufficient memory in the UE occurs, the HLR/AuC sets the MCEF (Mobile-Station-Memory-Capacity-Exceeded-Flag) of the MWD (Messages-Waiting-Data) to ON. When the FAP receives, from the UE, information indicating that the insufficient memory in the UE is eliminated, the FAP notifies the HLR/AuC of the information to that effect via the PDG, the CSCF, the IP-SM-GW, and the HSS/MAP-GW. When the HLR/AuC receives the information indicating that the insufficient memory in the UE is eliminated, the HLR/AuC sets the MCEF to OFF. The HLR/AuC notifies the SMSC of a retransmission request for a short message. When the SMSC receives a reproduction request for a short message from the HLR/AuC, the SMSC delivers the short message to the UE via the IP-SM-GW, the CSCF, the PDG, and the FAP. The circulation of the MS Present information and the circulation of the information concerning memory insufficiency are performed as separate processing operations.

Consequently, even in the case of the new communication system shown in FIG. 1 in which the FAP is installed, it is possible to perform delivery control same as that for a short message performed in the existing 3G.

It is also conceivable to provide the MNRF (Mobile-Station-Not-Reachable-Flag) in the VLR of the HSS/MAP-GW in the IMS-Femto network. However, when the HSS/MAP-GW cannot receive a signal from the nodes (the CSCF, the PDG, and the FAP) served under the HSS/MAP-GW, the HSS/MAP-GW cannot specify whether the HSS/MAP-GW cannot receive a signal because of the UE being out-of-range, because of an error of the nodes (the CSCF, the PDG, and the FAP) served under the HSS/MAP-GW, or because of other errors. Therefore, the HSS/MAP-GW cannot easily grasp an out-of-range state of the UE. Therefore, in this embodiment, the MNRF (Mobile-Station-Not-Reachable-Flag) is provided in the FAP that can easily grasp an out-of-range state of the UE. Consequently, the FAP can specify an out-of-range state of the UE and control ON and OFF of the MNRF. As a result, even in the case of the new communication system shown in FIG. 1 in which the FAP is installed, it is possible to perform delivery control same as that for a short message performed in the existing 3G.

When the FAP transmits a message for Ready For SM to the core network side, the FAP sets a value of a CPC (Calling Party's Category) parameter of a PPI (P-Preferred-Identity) header to cpc=notification. Consequently, even when the message for Ready For SM transmitted to the core network side by the FAP is a message of a user as a calling regulation target, it is possible to circulate the message for Ready For SM to the IP-SM-GW on the core network side without performing calling regulation for the message. A structure example of the message for Ready For SM generated by the FAP is shown in FIG. 25. FIG. 25 shows a structure example of a message used when information concerning return from out-of-range of the UE is notified to the core network side.

As shown in FIG. 25, in a SIP message for Ready For SM, I HYPERLINK "mailto:P-SM-GW@operator.com" P-SM-GW@operator.com is set in R-URI of a transmission destination, the IMSI of the UE is set in sip-uri of the PPI (P-Preferred Identify) header, notification is set in a value of the CPC (Calling Party's Category) parameter, application/vnd.3gpp.sms is set in Content-Type, and 06; RP-MT (SMMA), ff(fixed): RP-MR, 01: Reason (MSpresent) is set in a body unit. When the CSCF receives the SIP message shown in FIG. 25, since notification is set in the CPC parameter, even when the SIP message is a SIP message of a user relevant to the calling regulation set in the CSCF, the CSCF transmits the SIP message to the IP-SM-GW without performing the calling regulation. Consequently, even when the message for Ready For SM transmitted to the core network side by the FAP is a message of the user as the calling regulation target, it is possible to transmit, without performing calling regulation (e.g., calling regulation by ODB; Operator Determined Barring) in the CSCF, the message for Ready For SM to the IP-SM-GW on the core network side through the CSCF and transmit the message for Ready For SM to the HSS/MAP-GW via the IP-SM-GW.

Even if a value of the CPC parameter is set to priority, it is possible to cause the SIP message for Ready For SM to pass through the CSCF irrespectively of presence or absence of calling regulation and transmit the SIP message for Ready For SM to the IP-SM-GW. However, in this case, since this processing is processing for a preferential subscriber, it is likely that calling regulation is performed depending on a situation.

Therefore, in this embodiment, a value of the CPC parameter is set to notification. It is possible to cause the SIP message for Ready For SM to pass through the CSCF without the deficiency of the regulation.

The exemplary embodiment explained above is only an exemplary embodiment of the present invention and does not limit the scope of the present invention to the exemplary embodiment. The present invention can be carried out in various modified forms without departing from the spirit of the present invention.

For example, in the exemplary embodiment, the case in which the MNRF is provided in the FAP is explained. However, it is also possible to build the communication system to provide MNRG (Mobile Non Reachable for GPRS) rather than the MNRF and perform processing same as that of the MFRF. The MFRG is a flag used in controlling reachability of a packet SMS.

In the exemplary embodiment, the MAP-GW function is implemented as an internal function of the HSS that is a standard node and is explained as the HSS/MAP-GW. However, it is also possible to build, rather than implementing in the HSS, the MAP-GW function as a device exclusively for the MAP-GW function or build the MAP-GW function to be implemented in the IP-SM-GW that is another standard node.

In the exemplary embodiment, communication between the HSS/MAP-GW and the IP-SM-GW is performed by using the SCTP. However, the communication is not limited to the SCTP. It is possible to perform the communication using any protocol as long as the protocol is a protocol of an IP base.

In the exemplary embodiment, the IP-SM-GW discriminates, on the basis of a value of the Protocol Discriminator of the SIP message, whether a SIP message is the SMS (Short Message Service) or a service other than the SMS (SS; Supplementary Service, CheckIMEI, etc.) and, when the value of the Protocol Discriminator is the SMS, discriminates whether the RP-Message Type is the SMMA or other than the SMMA. When the IP-SM-GW discriminates that the value of the Protocol Discriminator is other than the SMS or when the value of the Protocol Discriminator is the SMS and the RP-Message Type is the SMMA, the IP-SM-GW performs protocol conversion and transmits and receives a message with the HSS/MAP-GW set as a transmission destination. When the value of the Protocol Discriminator is the SMS and the RP-Message Type is other than the SMMA, the IP-SM-GW performs protocol conversion and transmits and receives a message with the SMSC set as a transmission destination. However, as long as the functions such as the discrimination processing, the protocol conversion processing, and the transmission and reception processing performed in the IP-SM-GW can be realized, the present invention is not limited to the configuration of the exemplary embodiment performed in the IP-SM-GW. The present invention can be realized in the same manner in a configuration in which another apparatus has the functions performed in the IP-SM-GW.

Figure 26:
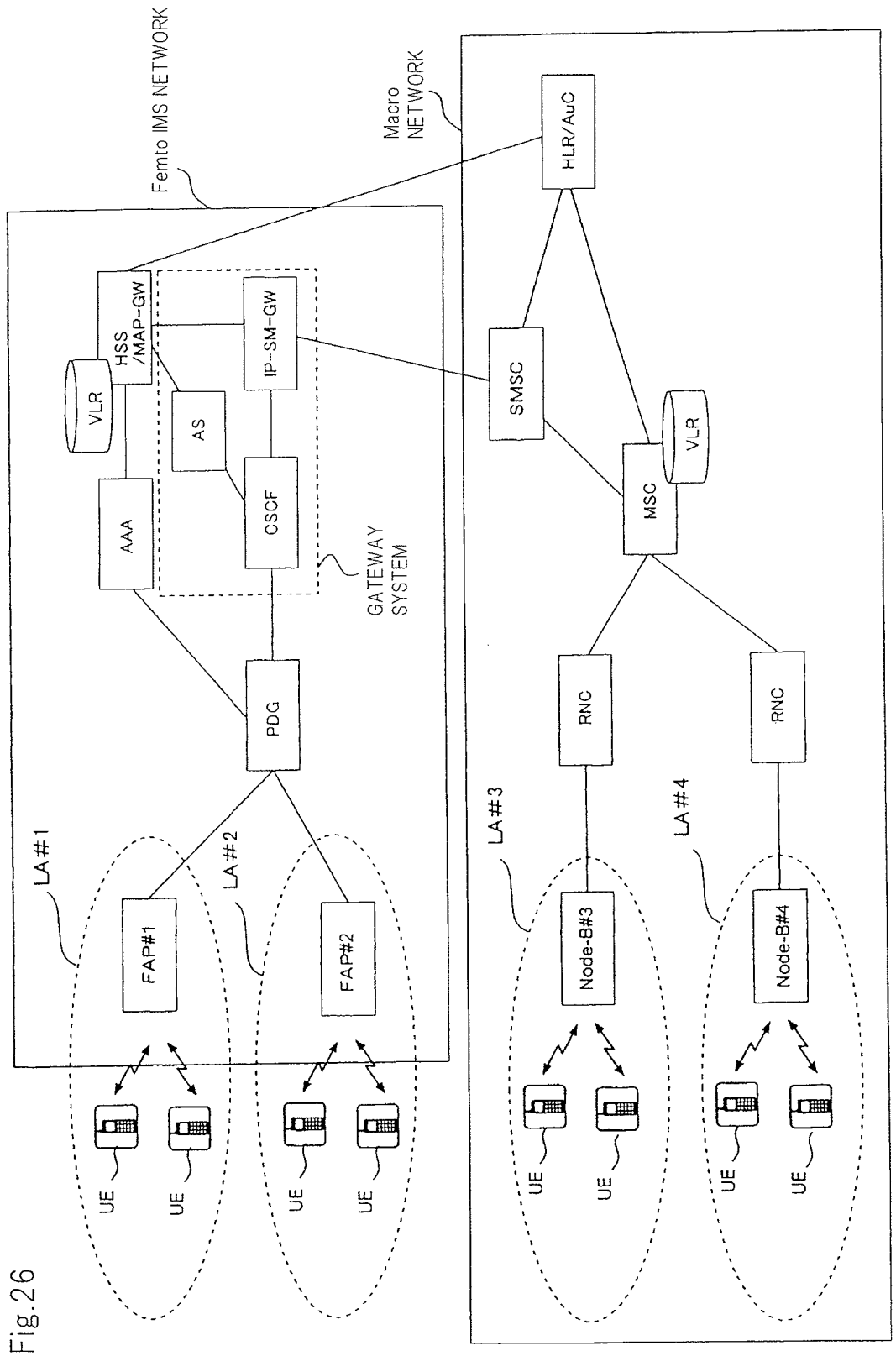
FIG. 26 is a diagram showing another system configuration example of the communication system according to the exemplary embodiment.

For example, as shown in FIG. 26, it is also possible to build the communication system such that the CSCF performs the discrimination processing according to a service allocating function provided as a standard, an AS (Application server; converting device) performs communication control between the CSCF and the HSS/MAP GW such as the protocol conversion processing and the transmission and reception processing, and the IP-SM-GW performs communication control between the CSCF and the SMSC such as the protocol conversion processing and the transmission and reception processing. In other words, the present invention can be realized in the same manner in a configuration in which a gateway system including the CSCF, the AS, and the IP-SM-GW implements the functions such as the discrimination processing, the protocol conversion processing, and the transmission and reception processing in the IP-SM-GW. When the configuration shown in FIG. 26 is built, it is possible to use a protocol of the IMS standard for communication between the CSCF and the AS and apply any protocol to communication between the AS and the HSS/MAP GW as long as the protocol is a protocol of the IP base.

When the configuration shown in FIG. 26 is built, it is also possible to build, by giving some service discriminator to header information of a SIP message transmitted to the SCSF by the FAP, the communication system such that the CSCF performs discrimination of a transmission destination according to iFC; initial Filter Criteria or the like on a subscriber profile.

In the configuration shown in FIG. 26, the AS is explained as having the communication control function between the CSCF and the HSS/MAP GW such as the protocol conversion processing and the transmission and reception processing. However, it does not particularly matter in which housing the configuration as the converting device for realizing this communication control function is provided. For example, the present invention can be realized in the same manner in a configuration in which the CSCF or the HSS including the converting device.

The communication system in the exemplary embodiment can perform processing without depending on a version of the 3GPP.

The control operations in the devices included in the communication system in the exemplary embodiment can also be executed by using hardware or software or a composite configuration of the hardware and the software.

When the processing is executed by using the software, it is possible to install a program having a processing sequence recorded therein in a memory in a computer incorporated in dedicated hardware and cause the computer to execute the program. Alternatively, it is also possible to install the program in a general-purpose computer that can execute various kinds of processing and cause the computer to execute the program.

For example, it is possible to record the program in a hard disk or a ROM (Read Only Memory) as a recording medium in advance. Alternatively, it is possible to temporarily or permanently store (record) the program in a removable recording medium. It is possible to provide such a removable recording medium as so-called package software. Examples of the removable recording medium include a floppy (registered trademark) disc, a CD-ROM (Compact Disc Read Only Memory), a MO (Magneto optical) disc, a DVD (Digital Versatile Disc), a magnetic disk, and a semiconductor memory.

The program is installed in the computer from the removable recording medium. The computer is transferred to the computer by radio from a download site. The program is transferred to the computer by wire via a network.

It is possible to build the communication system in the exemplary embodiment not only to execute the processing in time series according to the processing operations explained in the exemplary embodiment but also to execute the processing according to a processing ability of an apparatus that executes the processing or in parallel or individually according to necessity.

It is also possible to build the communication system in the exemplary embodiment as a logical set configuration of plural apparatuses or a configuration in which apparatuses having respective configurations are present in the same housing.

Figure 27:
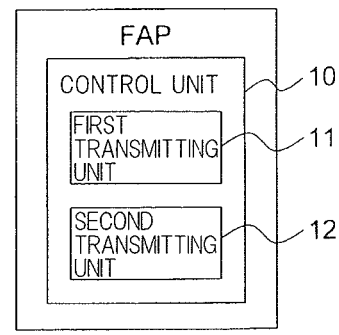
FIG. 27 is a block diagram showing a configuration example of the FAP.

A configuration example of the FAP is shown in FIG. 27.

As shown in FIG. 27, the FAP includes control unit 10 having the functions of the FAP implemented therein. Among the functions implemented on control unit 10, the function related to transmission to the core network side is implemented in first transmitting unit 11 and the function related to transmission to the UE is implemented in second transmitting unit 12.

Figure 28:
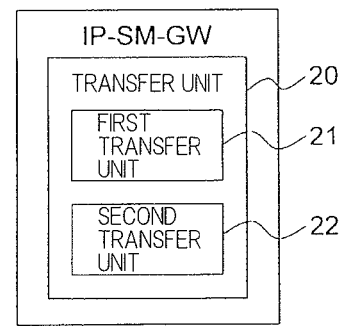
FIG. 28 is a block diagram showing a configuration example of an IP-SM-GW.

A configuration example of the IP-SM-GW is shown in FIG. 28.

As shown in FIG. 28, the IP-SM-GW includes transfer unit 20 having the functions of the IP-SM-GW implemented therein. Among the functions implemented on transfer unit 20, the function related to transfer to the FAP is implemented in first transfer unit 21 and the function related to transfer to the SMSC is implemented in second transfer unit 22.

As explained above, when the gateway system including the CSCF, the AS, and the IP-SM-GW has a configuration implemented with the functions in the IP-SM-GW, transfer unit 20 only has to be provided in one of the CSCF, the AS, and the IP-SM-GW included in the gateway system.

Figure 29:
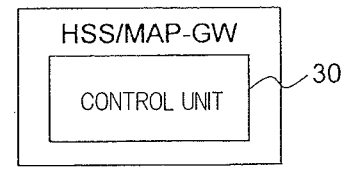
FIG. 29 is a block diagram showing a configuration example of a HSS/MAP-GW.

A configuration example of the HSS/MAP-GW is shown in FIG. 29.

As shown in FIG. 29, the HSS/MAP-GW includes control unit 30 having the MAP-GW function implemented therein.

When the MAP-GW function is implemented in the apparatus exclusively for the MAP-GW function and the IP-SM-GW as another standard node, control unit 30 only has to be provided in these apparatuses.

INDUSTRIAL APPLICABILITY

The present invention can be applied to a service offered by using a femtocell base station.

This application claims the priority based on Japanese Patent Application No. 2009-158002 filed on Jul. 2, 2009, the entire disclosure of which is incorporated herein.

The invention claimed is:

1. A gateway system that transfers, via a femtocell base station that connects User Equipment (UE) to a core network side, a short message to the UE, the gateway system comprising a transferrer configured to transfer, in a case where a Session Initiation Protocol (SIP) message is received and is to be transmitted to a Short Message Service Center (SMSC), content of the SIP message to the SMSC and transfer, on a condition that a received SIP message is to be transmitted to a destination other than the SMSC, the content of the SIP message to an apparatus on the core network side, wherein the transferrer is further configured to specify, on a condition that information indicating that the received SIP message is a Short Message Service (SMS) and information indicating that the SIP message is not Short Message Memory Available (SMMA) are included in the SIP message, that the received SIP message is transmitted to the SMSC, and to specify, on a condition that information indicating that the received SIP message is other than the SMS is included in the SIP message or information indicating that the SIP message is the SMS and information indicating that the SIP message is SMMA are included in the SIP message, that the received SIP message is transmitted to a destination other than the SMSC.

2. The gateway system according to claim 1, wherein the transferrer comprises:

a first transferrer configured to transfer, on a condition that a delivery request for the short message is received from the SMSC, the delivery request to the femtocell base station; and a second transferrer configured to transfer, on a condition that a response to the delivery request is not be received from the femtocell base station after a predetermined time elapses after the delivery request is transferred, information of a delivery error of the short message due to occurrence of a failure to the SMSC.

3. The gateway system according to claim 2, wherein the second transferrer is further configured to transfer, on a condition that Relay Protocol acknowledgement (RP-ACK) information is not received after a predetermined time elapses after a response to the delivery request is received, information of a delivery error of the short message due to the UE being out-of-range, to the SMSC.

4. The gateway system according to claim 2, wherein the second transferrer is further configured to transfer, on a condition that a response to the delivery request received from the femtocell base station indicates that the femtocell base station cannot act on the delivery request, information of a delivery error of the short message due to unconfirmation of a subscriber.

5. The gateway system according to claim 2, wherein the second transferrer is further configured to transmit, on a condition that MS Present information is received from the femtocell base station, the MS Present information to a Home Location Register (HLR) and transmit a retransmission request for the short message from the HLR to the SMSC.

6. The gateway system according to claim 5, wherein the second transferrer is further configured to transfer, on a condition that a message including Cause content is received from the HLR, the message including the Cause content to the femtocell base station.

7. The gateway system according to claim 2, wherein the second transferrer is further configured to transmit, on a condition that information indicating the occurrence of insufficient memory in the UE is received from the femtocell base station, the information that indicates this to a Home Location Register (HLR) via the SMSC and control to set a Mobile-Station-Memory-Capacity-Exceeded-Flag (MCEF) managed by the HLR to ON.

8. The gateway system according to claim 7, wherein the second transferrer means is further configured to transmit, on a condition that information indicating the occurrence of insufficient memory in the UE is received from the femtocell base station, the information that indicates this to the HLR, control to set a MCEF managed by the HLR to OFF, and transmit a retransmission request for the short message from the HLR to the SMSC.

9. A communication system comprising at least one User Equipment (UE), a femtocell base station configured to connect the UE to a core network side, a Short Message Service Center (SMSC) configured to manage a short message delivered to the UE, and a gateway system configured to transfer the short message to the UE via the femtocell base station, wherein the gateway system comprises a transferrer configured to, in a case where a Session Initiation Protocol (SIP) message is received, transfer, on a condition that the received SIP message is to be transmitted to the SMSC, content of the SIP message to the SMSC and transfer, on a condition that the received SIP message is to be transmitted to a destination other than the SMSC, the content of the SIP message to an apparatus on the core network side, wherein the transferrer is further configured to specify, on a condition that information indicating that the received SIP message is a Short Message Service (SMS) and on a condition that information indicating that the SIP message is not Short Message Memory Available (SMMA) are included in the SIP message, that the received SIP message is transmitted to the SMSC, and wherein the transferrer is further configured to specify, on a condition that information indicating that the received SIP message is other than the SMS is included in the SIP message or information indicating that the SIP message is the SMS and information indicating that the SIP message is SMMA are included in the SIP message, that the received SIP message is transmitted to a destination other than the SMSC.

10. A control method performed in a gateway system configured to transfer, via a femtocell base station that connects User Equipment (UE) to a core network side, a short message to the UE, the control method comprising:

in response to receiving a Session Initiation Protocol (SIP) message, transferring, on a condition that the received SIP message is to be transmitted to a Short Message Service Center (SMSC), content of the SIP message to the SMSC and transferring, on a condition that the received SIP message is to be transmitted to a destination other than the SMSC, the content of the SIP message to an apparatus on the core network side, wherein the transferring further comprises, on a condition that information indicating that the received SIP message is a Short Message Service (SMS) and information indicating that the SIP message is not Short Message Memory Available (SMMA) are included in the SIP message, transmitting the received SIP message to the SMSC, and on a condition that information indicating that the received SIP message is other than the SMS is included in the SIP message or information indicating that the SIP message is the SMS and information indicating that the SIP message is SMMA are included in the SIP message, transmitting the received SIP message to a destination other than the SMSC.

* * * * *

UNITED STATES PATENT AND TRADEMARK OFFICE
CERTIFICATE OF CORRECTION

PATENT NO. : 9,088,880 B2
APPLICATION NO. : 13/377754
DATED : July 21, 2015
INVENTOR(S) : Osamu Kurokawa et al.

It is certified that error appears in the above-identified patent and that said Letters Patent is hereby corrected as shown below:

In the specification

Column 10, Line 27: Delete "(step DD." and insert -- (step D1). --

Column 21, Line 53: Delete "09)." and insert -- O9). --

Column 24, Line 33: Delete "21 Ready" and insert -- <Ready --

In the claims

Column 30, Line 64: In Claim 8, delete "means is" and insert -- is --

Signed and Sealed this
Twelfth Day of January, 2016

Michelle K. Lee
*Director of the United States Patent and Trademark Office*